US012152560B2

(12) United States Patent
Annal et al.

(10) Patent No.: US 12,152,560 B2
(45) Date of Patent: Nov. 26, 2024

(54) POWER GENERATING APPARATUS

(71) Applicant: Orbital Marine Power Limited, Kirkwall Orkney Islands (GB)

(72) Inventors: William Annal, Kirkwall Orkney Islands (GB); Jonathan Meason, Kirkwall Orkney Islands (GB)

(73) Assignee: Orbital Marine Power Limited, Kirkwall Orkney Islanda (GB)

( * ) Notice: Subject to any disclaimer, the term of this patent is extended or adjusted under 35 U.S.C. 154(b) by 0 days.

(21) Appl. No.: 18/037,640

(22) PCT Filed: Nov. 18, 2021

(86) PCT No.: PCT/GB2021/052997
§ 371 (c)(1),
(2) Date: May 18, 2023

(87) PCT Pub. No.: WO2022/106832
PCT Pub. Date: May 27, 2022

(65) Prior Publication Data
US 2024/0011459 A1 Jan. 11, 2024

(30) Foreign Application Priority Data
Nov. 20, 2020 (GB) ..................... 2018290

(51) Int. Cl.
*F03B 17/06* (2006.01)
(52) U.S. Cl.
CPC ........ *F03B 17/061* (2013.01); *F05B 2240/93* (2013.01); *F05B 2250/411* (2013.01)
(58) Field of Classification Search
CPC ...... F03B 17/061; F03B 13/264; B63B 35/44; B63B 2035/4466; F05B 2240/93
See application file for complete search history.

(56) References Cited

U.S. PATENT DOCUMENTS 7,438,504 B2 * 10/2008 Henriksen ............. F03B 13/264
114/264
8,102,071 B2 * 1/2012 Catlin .................. F03B 13/264
290/43
(Continued)

FOREIGN PATENT DOCUMENTS

GB        2587316 A      3/2021
JP     2000 240555 A     9/2000
WO    WO 2018/115806 A1  6/2018

OTHER PUBLICATIONS

UK IPO Combined Search and Examination Report for Application No. GB2018290.3 dated Aug. 24, 2021.
(Continued)

*Primary Examiner* — Justin D Seabe
(74) *Attorney, Agent, or Firm* — MOSER TABOADA

(57) ABSTRACT

Disclosed herein is a power generating apparatus for extracting energy from flowing water. The apparatus comprises a buoyancy vessel, and a turbine assembly coupled to the buoyancy vessel. The turbine assembly comprises a turbine rotor mounted to a nacelle, and a support structure. The support structure comprises an open structure defining at least one void configured to provide a passage for water to flow through. The support structure is pivotally coupled at its inboard end to the buoyancy vessel at at least two vertically spaced connection locations and at its outboard end to the nacelle. The turbine assembly is pivotally moveable between a first position and a second position. When the power generating apparatus is floating on a body of water, in the first position the nacelle is fully submerged below the water surface; and in the second position at least a part of the nacelle is projects above the water surface.

20 Claims, 9 Drawing Sheets

(56) References Cited

U.S. PATENT DOCUMENTS

| | | | |
|---|---|---|---|
| 8,272,831 B2* | 9/2012 | Johnston | F03B 17/061 |
| | | | 416/85 |
| 8,668,452 B2* | 3/2014 | Henriksen | B63B 21/50 |
| | | | 416/85 |
| 11,845,525 B2* | 12/2023 | Vermes-Gabos | F03B 17/061 |
| 2007/0207028 A1* | 9/2007 | Nicholas | F03B 17/061 |
| | | | 415/3.1 |
| 2009/0096216 A1 | 4/2009 | Power, III et al. | |

OTHER PUBLICATIONS

International Search Report and Written Opinion for PCT/GB2021/052997 dated Jan. 26, 2022.

* cited by examiner

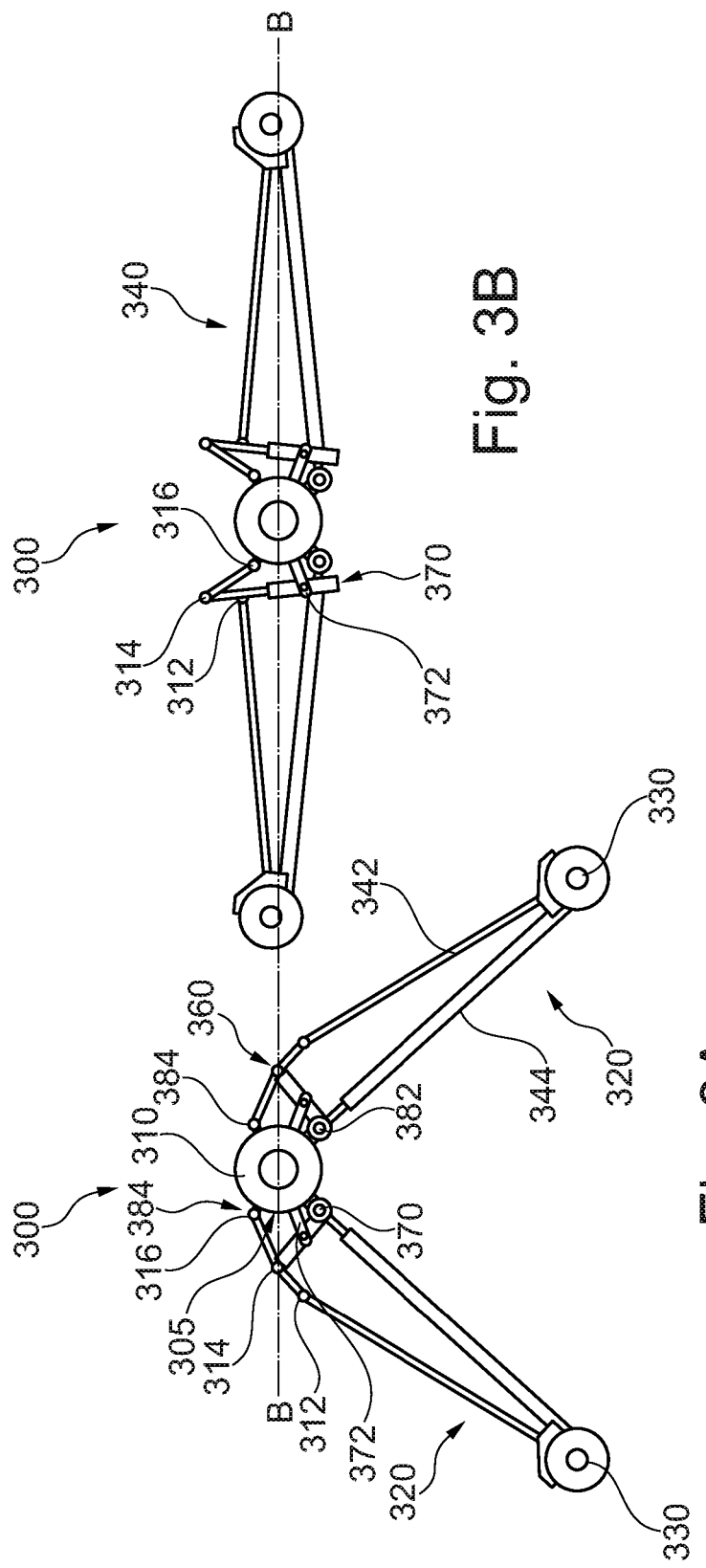

POWER GENERATING APPARATUS

FIELD OF THE INVENTION

The invention relates to the field of power generating apparatus, for extracting energy from flowing water, and in particular to a floating generating apparatus for use for example in the marine or river environment.

BACKGROUND TO THE INVENTION

In recent years there has been a move towards energy generation from renewable energy sources, including the use of movable apparatus such as turbines to harvest energy from fluid movement, such as wind, tidal and wave power.

Energy generation from flowing water benefits from being capable of generating a relatively predictable energy supply, whether from a tidal stream or a river. A great number of power generating apparatus for generating electricity from flowing water have been proposed; including apparatus fixed to the seabed, for example as described in US2015260148 (Aquantis, Inc), and floating apparatus, for example as described in WO 2015/090414 (Bluewater Energy Services).

Floating generators provide both a visible above-water warning that the generator is present, and are generally better able to utilise the faster streams that occur near the water surface (particular tidal streams) and accommodated changes in water level (particularly tidal changes). In addition, floating generators have lower operation and maintenance costs than power generating apparatuses that are fully submerged underwater.

Generating apparatus of this type may be large scale, particularly for tidal and marine applications, and so may be costly to manufacture and deploy. Some of these problems were addressed by the generating apparatus described by the applicant in EP1831544. The generating apparatus described in EP1831544 has turbine nacelles capable of being stowed close to the main buoyancy vessel, which reduces both the draft and the hydrodynamic drag of the generator. However, in some circumstances it may be desirable to still further reduce drag and/or draft.

Aggressive subsurface conditions also provide significant challenges in the use of such generating apparatus, and there is generally a trade-off between the costs of accessing normally submerged components for maintenance, and the engineering costs of apparatus engineered for very long service intervals. Some of these problems were addressed by the generating apparatus described in EP3559440. The apparatus disclosed in EP3559440 has a turbine assembly coupled to a buoyancy vessel, the turbine assembly comprising a turbine rotor mounted to a nacelle, and a support structure. The turbine assembly is pivotally moveable between a first position (in use fully submerged below the water surface) and a second position (with at least a part of the nacelle projecting above the water surface). Movement of the turbine assembly to the second position may be desirable to reduce the draft or the drag of the power generating apparatus, for example when the power generating apparatus is being relocated, or to prevent damage during storms. Furthermore, movement of the turbine assembly to the second position allows access into the nacelle while the power generating apparatus remains in the water, thus further minimising operation and maintenance costs.

However, in some circumstances it may be desirable to still further reduce drag and/or draft, and to further improve the roll stability and efficiency of existing power generation apparatuses. Furthermore greater flexibility on the scalability of the apparatus and/or its turbine or turbines is also desirable in order to maximise the amount of energy that can be harvested with each apparatus.

There remains a need for generating apparatus for extracting energy from flowing water which address or mitigates one or more of these issues.

SUMMARY OF THE INVENTION

According to a first aspect of the invention, there is provided a power generating apparatus for extracting energy from flowing water. The power generating apparatus may comprise
 a buoyancy vessel, and a turbine assembly coupled to the buoyancy vessel.
 The turbine assembly may comprise a turbine rotor mounted to a nacelle. The turbine assembly may comprise a support structure. The support structure may comprise an open structure defining at least one void configured to provide a passage for water to flow through. The support structure may be movably coupled at its inboard end to the buoyancy vessel at at least two vertically spaced connection locations. The support structure may be coupled at its outboard end to the nacelle. The turbine assembly may be pivotally moveable between a first position and a second position.
 When the power generating apparatus is floating on a body of water,
  in the first position the nacelle may be configured to be fully submerged below the water surface, and
  in the second position at least a part of the nacelle may be configured to project above the water surface.

In the first position, the nacelle is submerged and the turbine rotor is capable of being driven by movement of water flowing past the power generating apparatus (for example a tidal stream or the flow of a river). Movement of the turbine assembly to the second position may be desirable to reduce the draft and, in some instances, also the drag of the power generating apparatus, for example when the power generating apparatus is being relocated.

In the second position, at least a portion of the nacelle projects above the water surface, so as to provide access thereto for maintenance or repair. This may avoid the need for large and expensive barges/cranes, e.g. to raise the entire power generating apparatus from the water and so facilitate more frequent, rapid and cheaper maintenance than would otherwise be possible.

Increased ease of access to the nacelle or support structure may in turn facilitate the use of equipment having a shorter services interval, or may enable certain apparatus to be viably located in the turbine assembly (such as fluid filters, lubricating or cooling fluid reservoirs or circuits, or electricity generating equipment). The power generating apparatus of the present invention may therefore avoid some of the design compromises that have previously been required.

The at least a portion of the nacelle projecting above the water surface in the second position may be provided with an access hatch, providing access to apparatus housed therein.

The turbine assembly may pivot with respect to the buoyancy vessel between the first and second positions. The support structure and the nacelle of the turbine assembly may be pivotally movable together or "as a whole" between the first and second positions.

The power generating apparatus may comprise a single buoyancy vessel (or hull) (as compared, for example to two or more interconnected buoyancy vessels (or hulls)).

The buoyancy vessel may have any suitable configuration. However, in some embodiments, the buoyancy vessel is elongate and may be generally cylindrical, so as to provide limit hydrodynamic drag and wave loading. In embodiments in which the buoyancy vessel is elongate, the buoyancy vessel may have a longitudinal axis disposed substantially parallel to the water surface (in use).

A generally cylindrical (in cross section) buoyancy is inherently extremely strong and may be of particular benefit in adverse weather conditions, such as may be encountered in the marine environment.

The buoyancy vessel may itself be provided with a ballasting system (comprising ballast tanks, desirably front and rear), by which the trim of the power generating apparatus may be adjusted, in some embodiments automatically. The ballasting system may be used to compensate for the varying forces applied by a river or tidal flow impinging on the turbine rotor or other parts of the turbine assembly.

The or each turbine assembly may be coupled to a bow or stern section of the buoyancy vessel (it being understood that in some embodiments, the terms bow and stern are arbitrary).

The or each turbine assembly may be coupled to the buoyancy vessel at any position of the buoyancy vessel between about $\frac{1}{2}$ and $\frac{1}{13}^{th}$ of the length of the buoyancy vessel. The or each turbine assembly may be coupled to the buoyancy vessel at more than one location. For example, the or each turbine assembly may be coupled (directly and/or indirectly) to the buoyancy vessel at two or more horizontally spaced locations. The or each turbine assembly may be coupled (directly and/or indirectly) to the buoyancy vessel at two or more vertically spaced locations. For example, the or each turbine assembly may be coupled to the buoyancy vessel at two horizontally spaced locations and two vertically spaced locations. The turbine assembly may be movably coupled to the buoyancy vessel at each of the coupling locations. For example, the turbine assembly may be rotatably or pivotally coupled to the buoyancy vessel at each of the coupling locations. All of the coupling locations of the turbine assembly to the buoyancy vessel may be disposed between about $\frac{1}{2}$ and $\frac{1}{13}^{th}$ of the length of the buoyancy vessel. All of the coupling locations of the turbine assembly to the buoyancy vessel may be disposed between about $\frac{1}{2}$ and $\frac{1}{13}^{th}$, or between about $\frac{1}{2}$ and about $\frac{1}{12}^{th}$, or between about $\frac{1}{2}$ and about $\frac{1}{11}^{th}$, or between about $\frac{1}{2}$ and about $\frac{1}{10}^{th}$, or between about $\frac{1}{2}$ and about $\frac{1}{9}^{th}$, or between about $\frac{1}{2}$ and about $\frac{1}{8}^{th}$, or between about $\frac{1}{2}$ and about $\frac{1}{7}^{th}$, or between about $\frac{1}{2}$ and about $\frac{1}{6}^{th}$, or between about $\frac{1}{2}$ and about $\frac{1}{5}^{th}$, or between about $\frac{1}{2}$ and about $\frac{1}{4}^{th}$, or between about $\frac{1}{2}$ and about $\frac{1}{3}^{th}$, or between about $\frac{1}{3}^{th}$ and about $\frac{1}{13}^{th}$, or between about $\frac{1}{5}^{th}$ and about $\frac{1}{13}^{th}$, or between about $\frac{1}{6}^{th}$ and about $\frac{1}{13}^{th}$, or between about $\frac{1}{8}^{th}$ and about $\frac{1}{13}^{th}$, or between about $\frac{1}{9}^{th}$ and about $\frac{1}{13}^{th}$ or between about $\frac{1}{10}^{th}$ and about $\frac{1}{13}^{th}$, or between about $\frac{1}{11}^{th}$ and about $\frac{1}{13}^{th}$, or between about $\frac{1}{12}^{th}$ and about $\frac{1}{13}^{th}$, of the length of the buoyancy vessel. For example, a first coupling location of the turbine assembly to the buoyancy vessel may be located towards the middle of the length of the buoyancy vessel. A second coupling location of the turbine assembly to the buoyancy vessel may be disposed towards the stern (or the rear) of the buoyancy vessel. All of the coupling locations may be disposed towards the stern of the buoyancy vessel. Additional coupling locations may be disposed between the first and the second coupling locations.

The buoyancy vessel may comprise a keel.

The power generating apparatus may comprise two, or more than two, turbine assemblies. The turbine rotor of two such turbine assemblies may be counter-rotating.

The turbine rotor may comprise any suitable number of blades. The turbine rotor may comprise 2 blades, or 3 blades, or 4 blades, or 5 blades, or 6 blades. In some embodiments the turbine rotor may comprise 2 blades. In preferred embodiments, the turbine rotor may comprise two blades. When the turbine assembly is in the second position, turbine rotors having two blades can be positioned such that the two blades are substantially parallel to the water surface, thus minimising the draft experienced by the power generating apparatus, particularly during towing. In contrast, embodiments having three or more turbine rotors have at least one blade pointing downwards or partially towards the water surface, and this increases the draft of the structure, particularly during towing.

The power generating apparatus may comprise two or more turbine assemblies symmetrically disposed in relation to the buoyancy vessel. The power generating apparatus may be configured such that the turbine assemblies are symmetrically disposed at all times (i.e. in the first position, the second position and during movement therebetween). That is to say, the symmetrically disposed turbine assemblies may be symmetrically and pivotally moveable between their first a second positions.

In some embodiments, the power generating apparatus comprises two turbine assemblies, extending symmetrically in relation to a longitudinal axis of the buoyancy vessel.

Such symmetrically disposed turbine assemblies may, in normal use, be tethered together in the first position, for example by a cable extending between the turbine assemblies. The cable may form part of a powered mechanism, for mechanically assisting and/or damping motion between the first and second positions.

The turbine assembly may be biased to the first position. The turbine assembly may be biased to the second position.

It is to be understood that the power generating apparatus as a whole is buoyant and, in use, floats on a body of water.

The power generating apparatus may comprise a powered mechanism, for moving the/each turbine assembly from the first to the second positions and/or from the second to the first position.

Movement between the first and second positions may at least in part be mechanically assisted, by the powered mechanism, e.g. a mechanism comprising a hydraulic ram, an arrangement of cables and a winch, or the like. Movement of the turbine assembly may be initiated by a powered mechanism. A powered mechanism may assist in lifting the nacelle, or a greater part of the nacelle, above the water surface.

In normal use, the powered mechanism may be the primary means of moving between the first and second positions, with buoyancy (e.g. by means of buoyant volumes such as tanks within the turbine assembly or assemblies) providing additional assistance. The turbine assemblies may for example be configured for variable buoyancy to be used as a back-up to the powered mechanism, or vice versa.

The powered mechanism may comprise a cable and a winch (examples of which are described below).

The winch may be used to limit the rate of movement in the opposite direction, throughout at least the latter part (and in some cases the entire) range of motion of the turbine assembly.

The powered mechanism may be hydraulically powered. A hydraulic mechanism may comprise a hydraulic ram (i.e. a hydraulically controllable piston).

A hydraulic ram may be operatively coupled between the buoyancy vessel and a said turbine assembly (most typically a support structure thereof).

A hydraulic ram may be operatively connected between one or other of the turbine assembly and a mechanical linkage arrangement, wherein the mechanical linkage arrangement is coupled at a first end to the turbine assembly and at a second end to the buoyancy vessel, the distance between the first and second end of the mechanical linkage arrangement being variable by operation of the hydraulic ram.

The hydraulic ram may be pivotally connected to the buoyancy vessel, turbine assembly and mechanical linkage arrangement, as the case may be. A hydraulic ram is typically coupled at two points and each may be pivotal connections.

The buoyancy vessel and/or the turbine assembly (or support structure thereof) may comprise a fly brace, for connection to the mechanical linkage arrangement; to thereby increase leverage.

The mechanical linkage arrangement may comprise two or more pivotally interconnected linkages extending from the first to the second end. In some embodiments, when the turbine assembly is in the first position, the linkages are generally aligned between the first and second ends.

The hydraulic ram may have an axis (along which it deploys in use) that crosses a line described between the first and second ends of the mechanical linkage arrangement; at least when the respective turbine assembly is close to the first position, and optionally throughout the range of motion of the turbine assembly.

The hydraulic ram may have an axis extending generally perpendicular to the said line at least when the respective turbine assembly is close to the first position, and optionally throughout the range of motion of the turbine assembly.

It will be understood that as the turbine assemblies pivot between the first and second positions, the first and second ends of the mechanical linkage arrangement describe an arc in relation to one another.

The powered mechanism may be configured such that the orientation of the axis of the hydraulic ram changes throughout the range of motion of the associated turbine assembly. The angle at which it crosses the line between the first and second ends may remain generally constant (e.g. perpendicular).

In use of the power generating apparatus, forces are transmitted to the buoyancy vessel from the turbine assemblies due to motion of the rotors (e.g. changes in rotor speed or forces applied thereto) and forces which act upon the turbine assembly/assemblies (e.g. caused by waves, changes in tidal force/direction and the like). Where the hydraulic ram deploys along an axis that crosses said arc, it is isolated to some degree from such dynamic forces.

This may be of particular benefit when the turbine assembly is at or near the first position, where the leverage applied between the ends of the mechanical linkage arrangement and the hydraulic ram is at a maximum (e.g. when two or more mechanical linkages are aligned). In this way, the hydraulic ram is better able to retain the turbine assembly in the first position, to resist dynamic forces that arise in use. The mechanical linkage arrangement (and any associated pivotal connections) may be configured to remain above the waterline in the second position, in normal use. At least part of the mechanical linkage arrangement (and any associated pivotal connections) may be configured to remain below the waterline in the second position, in normal use.

Each turbine assembly may be associated with a hydraulic ram (or more than one hydraulic ram) and, as the case may be, a corresponding mechanical linkage arrangement or arrangements.

A powered mechanism may be used to provide hydraulic resistance to said movement, in one direction, and mechanical assistance in the other direction.

A powered mechanism may be used to control or limit the rate of motion in one or both directions, along at least a part of the range of motion between the first and second positions. For example, where the/each turbine assembly is negatively buoyant, the powered mechanism (e.g. comprising a hydraulic ram as disclosed herein) may control or limit the rate of motion of the/each turbine assembly from the second to the first position.

This methodology may be of particular benefit to the overall stability of the power generating apparatus during movement between the first and second positions, particularly when the turbine assembly is closer to the second position (and thus has the greatest effect on changes in overall buoyancy and stability of the power generating apparatus). Embodiments having more than one turbine assembly may be prone to instability during movement of the turbine assemblies, which instability may be limited by applying mechanical control over the rate and in some cases symmetry of movement.

The powered mechanism may comprise position measurement apparatus, operable to detect the position of the powered mechanism, and thus the/each turbine assembly. The powered mechanism may be associated with a controller operable to control the powered mechanism, based on information received from the position measurement apparatus. This may for example facilitate synchronisation of the movement of two or more turbine assemblies and/or assist in maintaining the stability of the power generating apparatus.

The turbine assembly may optionally be retained in the first position by a cable extending for example between the nacelle and a location on the buoyancy vessel or another turbine assembly.

Movement towards one or more of the first or second position may be damped.

Motion may be mechanically damped, for example by a buffer. Each turbine assembly may comprise a buffer, or a component thereof. A turbine assembly may be buffered against the buoyancy vessel, or (where there are two or more symmetrically disposed turbine assemblies) against another turbine assembly.

Motion may be "damped" by varying the buoyancy of the turbine assembly, as it approaches a respective position. This may be achieved for example by the provision of more than one, or a series, of ballast tanks, which may be selectively filled or emptied so as to vary the buoyancy force as a turbine assembly approaches the first or second position, as the case may be.

Motion may in some embodiments be damped using a powered mechanism, for example which may act as a "brake" to movement toward the first and/or second position.

A powered mechanism for assisting movement between the first and second positions may in some circumstances be used to brake or damp motion in the opposite direction.

The turbine assembly may be pivotally moveable around a hinge arrangement.

The power generating apparatus may comprise any suitable type of hinge arrangement, for example a pin-joint or bushing. The hinge arrangement may comprise a single hinge or multiple hinges, e.g. two or more hinges arranged along an axis. The hinge arrangement may comprise one or more journal bearings, fibre bearings or the like. The hinge arrangement may be water lubricated.

The hinge arrangement may be above or below the waterline. For example, the hinge arrangement may be below the waterline in the first position and in the second position.

The hinge arrangement may form part of the turbine assembly, or part of the buoyancy vessel.

The turbine assembly may be coupled to the buoyancy vessel via the hinge arrangement. For example, the turbine assembly may comprise a part of the hinge arrangement, such as one or other of a padeye or a hinge clevis, and the buoyancy vessel may comprise a complimentary part of the hinge arrangement.

The turbine assembly may alternatively be coupled to the buoyancy vessel by a separate coupling arrangement, such as a flange coupling or the like. In such embodiments, the hinge arrangement may be inboard of the coupling arrangement (i.e. forming part of the buoyancy vessel) or outboard of the hinge arrangement (i.e. forming part of the support structure of the turbine assembly).

The turbine assembly may pivot around an axis that is generally parallel to a longitudinal axis of buoyancy vessel.

The hinge arrangement and/or secondary hinge arrangement where present may for example comprise a latch or be associated with a latch or a component part thereof.

A hinge arrangement may be associated with more than one latch, for example to enable the turbine assembly to be retained in each of two positions between which a hinge arrangement can move.

The power generating apparatus may comprise any suitable type of latch or latches. For example, the apparatus may comprise a magnetic latch between a permanent or electro magnet and corresponding material attracted thereto. The apparatus may comprise a mechanical or electromechanical latch, for example comprising a shear pin.

The orientation of the turbine assembly with respect to the buoyancy vessel may change between the first and second positions. The turbine assembly may move outboard from the buoyancy vessel from the first position to the second position. In the first position the turbine assembly may extend below, and optionally to the side of (i.e. extending diagonally below), the buoyancy vessel. In the second position, the turbine assembly may extend generally to the side of the buoyancy vessel.

Within the context of this disclosure, the baseline of the buoyancy vessel is defined as the lowest point of the buoyancy vessel (when the buoyancy vessel is floating on a body of water). The waterline of the buoyancy vessel may be defined as the location on the hull or body of the buoyancy vessel where the air-water interface occurs (when the buoyancy vessel is floating on a body of water). The draught of the buoyancy vessel is defined as the distance between the baseline and the waterline of the buoyancy vessel (when the buoyancy vessel is floating in a body of water, as in normal use). The freeboard of the buoyancy is defined as the difference between the total height of the buoyancy vessel and the draught.

The freeboard is measured from the waterline to the uppermost portion of the buoyancy vessel (viewed when the buoyancy vessel is floating on a body of water). The draught and freeboard combined give the height of the buoyancy vessel.

The support structure may be an open structure or a partially open structure. The support structure may define one or more voids or holes between its inboard end and its outboard end. The support structure may be configured to define a path or passage through which, in use, water can flow. The support structure may be configured to define a passage through which water can flow in a longitudinal direction (that is, along the longitudinal axis of the power generating apparatus). The support structure may be configured to define a passage through which water can flow in a vertical direction (that is, in a direction substantially perpendicular to the longitudinal axis of the power generating apparatus). In some embodiments, the support structure may be an open frame or a framework.

The support structure may be open from a side. In other words, the support structure may define one or more voids or holes between its inboard end and its outboard end when looking at the power generating apparatus along a longitudinal axis of the buoyancy vessel.

The support structure may be open from the top (when looking at the power generating apparatus in its use configuration floating on a body of water). In other words, the support structure may define a void or hole between its inboard end and its outboard end when looking at the power generating apparatus from above when the apparatus is floating on a body of water.

The support structure may comprise a top portion and a bottom portion. For the avoidance of doubt, in normal use the bottom portion is configured to be disposed below the top portion (i.e. closer to the sea or river bed than the top portion) when the device is floating on a body of water.

The top portion and the bottom portion may both be coupled to the nacelle at the outboard end of the support structure. The top portion and the bottom portion may be integral with the nacelle or they may be directly or indirectly fixedly coupled to the nacelle by any suitable means (e.g. bolting or welding).

The top portion and the bottom portion may both be movably coupled to the buoyancy vessel at the inboard end of the support structure. The top portion and/or the bottom portion may be pivotally coupled to the buoyancy vessel.

The top portion and the bottom portion may be vertically spaced apart. The top portion and the bottom portion may be substantially parallel to each other. The top portion and the bottom portion may be disposed at an angle with respect from each other. For example, the top portion may be disposed at an angle between about 0 and about 60 degrees with respect to the bottom portion. The top portion may be disposed at an angle from about 0° to about 30°, or from about 0° to about 15°, or from about 8° to about 20°, or from about 100 to about 30°, or from about 200 to about 40°, or from about 400 to about 600 with respect to the bottom portion. In preferred embodiments, the top portion may be disposed at an angle of from about 100 to about 150 degrees with respect to the bottom portion.

The top portion may be substantially straight. The top portion may be curved. The top portion may comprise at least two straight portions disposed at an angle with respect to each other. The top portion may be bent. The top portion may define an apex or trough along its length.

The bottom portion may be substantially straight. The bottom portion may be curved. The bottom portion may comprise at least two straight portions disposed at an angle with respect to each other. The bottom portion may be bent. The top portion may define an apex or trough along its length.

The top portion and the bottom portion may be solid or they may be hollow. The top portion and the bottom portion may comprise one or more of a plate, a blade a shaft, a bar, a hollow tube (of any suitable cross-section), or the like.

The top portion, the bottom portion or both may comprise one or more structural components. The top portion, the bottom portion or both may comprise a main member that runs from the inboard end to the outboard end of the support structure. The top portion, the bottom portion or both may comprise a main member that runs from the inboard end to the outboard end of the support structure and one or more branched members extending from the main member to the inboard end of the support structure. In embodiments in which the main member is branched, the main member and the one or more branched members may be integral or they may be rigidly coupled to each other by any suitable means, such as bolting or welding. Alternatively, the main member and the one or more branched members may be movably coupled to each other. The main member may be connected to or integral with the nacelle at the outboard end of the support structure. The main member may be pivotally connected to the buoyancy vessel at the inboard end of the support structure. The one or more branched members may be pivotally connected to the buoyancy vessel at the inboard end of the support structure. The one or more branched members and the main member may be pivotally connected to the buoyancy vessel in a spaced arrangement along the longitudinal axis of the buoyancy vessel. In other words, the one or more branched members and the main member may be pivotally coupled to the buoyancy vessel in a horizontally spaced arrangement along the length of the buoyancy vessel.

The connection points of the one or more branched members and the main member to the buoyancy vessel may be spaced along the length of the buoyancy vessel by a distance of from about $1/13^{th}$ to about $1/6^{th}$ of the total length of the buoyancy vessel. The connection points of the one or more branched members and the main member to the buoyancy vessel may be spaced along the length of the buoyancy vessel by a distance of from about $1/13^{th}$ to about $1/10^{th}$, or from about $1/10^{th}$ to about $1/6^{th}$, or from about $1/8^{th}$ to about $1/6^{th}$, or from about $1/10^{th}$ to about $1/8^{th}$, or from about $1/11^{th}$ to about $1/12^{th}$, or from about $1/9^{th}$ to about $1/7^{th}$ of the total length of the buoyancy vessel. For example, the connection points of the one or more branched members and the main member to the buoyancy vessel may be spaced along the length of the buoyancy vessel by a distance of about $1/6^{th}$, or about $1/7^{th}$, or about $1/8^{th}$, or about $1/9^{th}$, or about $1/10^{th}$, or about $1/11^{th}$, or about $1/12^{th}$, or about $1/13^{th}$ of the total length of the buoyancy vessel.

In some embodiments the main member and the one or more branched members may be pivotally connected to the buoyancy vessel along a line that is substantially parallel to the longitudinal axis of the buoyancy vessel. In embodiments in which the top portion and/or the bottom portion comprises three or more branched members, the connection points of the main member and the two or more branched members may be aligned or misaligned.

Without wishing to be bound by theory, spacing out two or more connection points of the top portion and/or the bottom portion of the support structure to the buoyancy vessel may increase the mechanical advantage of the support structure for resisting the thrust force experienced at the rotors. Providing an open support structure enables a greater horizontal distances between attachment points than in closed support structures. Open support structures also provide greater flexibility for optimisation of the load paths of the support structure on the buoyancy vessel by determining the optimal location of the connection points of the support structure to the buoyancy vessel. This in turn allows apparatuses according to the invention to resist the thrust force and maximise the mechanical advantage for effecting the movement between the first and second positions of the turbine assembly.

The top portion and the bottom portion may be pivotally coupled to the buoyancy vessel at vertically spaced locations.

The top portion may be pivotally coupled to the buoyancy vessel at one or more locations disposed closer to the waterline (when the power generation apparatus is floating on a body of water) than the one or more locations at which the bottom portion is pivotally coupled to the buoyancy vessel. The bottom portion may be pivotally coupled to the buoyancy vessel at one or more locations that are configured to remain below the waterline when the apparatus is floating on a body of water. The top portion may be pivotally coupled to the buoyancy vessel at one or more locations that are configured to remain above the waterline when the apparatus is floating on a body of water. In use, the top portion may be pivotally coupled to the buoyancy vessel at one or more locations that are configured to remain above the waterline and is/are closer to the waterline than the connection point or points of the bottom portion to the buoyancy vessel. Connecting the top portion and the bottom portion to the buoyancy vessel at vertically spaced locations maximises the mechanical advantage for moving the turbine assembly between the first and second positions.

The top portion and/or the bottom portion may be pivotally connected to the buoyancy vessel at one or more pivot points. The top portion and/or the bottom portion may be pivotally connected to the buoyancy vessel by means of a ram with a corresponding mechanical linkage arrangement or arrangements. In some embodiments, the top portion may be indirectly coupled to the buoyancy vessel by means of a mechanical linkage and the bottom portion may be directly coupled to the buoyancy vessel at a pivot point, for example by means of a hinge arrangement. The mechanical linkage may be associated coupled to the buoyancy vessel at one end and to the top portion at the other end. The mechanical linkage may also be associated with a ram.

The connection point or points of the top portion of the support structure to the buoyancy vessel may be vertically and horizontally offset from the connection point or points of the bottom portion of the support structure to the buoyancy vessel.

The top portion may be indirectly connected to the buoyancy vessel. For example, in embodiments in which the top portion is connected to the buoyancy vessel by means of a ram and associated linkage arrangement and arrangements, the top portion of the support structure may be pivotally connected to one end of a linkage arrangement and the other end of the linkage arrangement may be connected to the buoyancy vessel. The linkage arrangement may also be connected to the ram. The ram may be connected to the buoyancy vessel at two points. One of the connection points of the ram to the buoyancy vessel may be the connection point of the linkage arrangement to the buoyancy vessel. The other connection point of the ram to the buoyancy vessel may be disposed below the connection point of the linkage arrangement to the buoyancy vessel. The connection point of the linkage arrangement to the buoyancy vessel may be above the waterline.

The connection point or points of the top portion of the support structure to the buoyancy vessel may be located close to the waterline. The connection point or points of the top portion of the support structure to the buoyancy vessel may be located above the waterline, for example just above the waterline. The connection point or points of the top portion of the support structure to the buoyancy vessel may be located above a horizontal cross-sectional plane containing the longitudinal axis of the buoyancy vessel. That is, the connection point or points of the top portion of the support structure to the buoyancy vessel may be located on the upper half of the buoyancy vessel. The connection point or points of the top portion support structure to the buoyancy vessel may be configured to be located above the longitudinal axis of the buoyancy vessel at a distance of from about 5% to about 50% of the total height of the buoyancy vessel. For example, the connection point or points of the top portion support structure to the buoyancy vessel may be configured to be located above the longitudinal axis of the buoyancy vessel at a distance of from about 5% to about 45%, or about 5 to about 40%, or about 5% to about 30%, or about 5% to about 20%, or about 5% to about 10%, or about 30% to about 50%, or about 30% to about 40%, or about 10% to about 40%, or about 10% to about 30%, or about 10% to about 20%, or about 10% to about 45% of the total height of the buoyancy vessel. The connection point or points of the top portion of the support structure to the buoyancy vessel may be associated with a ram and associated linkage mechanism.

The connection point or points of the bottom portion of the support structure to the buoyancy vessel may be disposed at or towards the baseline of the buoyancy vessel. The connection point or points of the bottom portion of the support structure to the buoyancy vessel may be located below a horizontal cross-sectional plane containing the longitudinal axis of the buoyancy vessel. That is, the connection point or points of the bottom portion of the support structure to the buoyancy vessel may be located on the lower half of the buoyancy vessel. The connection point or points of the bottom portion of the support structure to the buoyancy vessel may be associated with hinge arrangement.

The connection point or points of the bottom portion of the support structure to the buoyancy vessel may be disposed between the baseline of the buoyancy vessel and the location of the connection point or points of the top portion of the support structure to the buoyancy vessel. The connection point or points of the bottom portion of the support structure to the buoyancy vessel may be vertically separated from the connection point or points of the top portion of the support structure to the buoyancy vessel by a distance of from about 50% to about 100% of the total height of the buoyancy vessel. The connection point or points of the bottom portion of the support structure to the buoyancy vessel may be vertically separated from the connection point or points of the top portion of the support structure to the buoyancy vessel by a distance of from about 50% to about 75%, or from about 50% to about 60%, or from about 60% to about 80%, or from about 70% to about 90%, or from about 75% to about 90%, or from about 80% to about 100%, or from about 90% to about 100% of the total height of the buoyancy vessel.

The connection point or points of the bottom portion of the support structure to the buoyancy vessel may be vertically separated from the connection point or points of the top portion of the support structure to the buoyancy vessel by a distance of from about $1/6^{th}$ to about $1/13$th of the average length of the support structure from the inboard end to the outboard end. The connection point or points of the bottom portion of the support structure to the buoyancy vessel may be vertically separated from the connection point or points of the top portion of the support structure to the buoyancy vessel by a distance of from about $1/6^{th}$ to about $1/10^{th}$, or from about $1/7^{th}$ to about $1/9^{th}$ or from about $1/6^{th}$ to about $1/8^{th}$, or from about $1/8^{th}$ to about $1/11^{th}$, or from about $1/8^{th}$ to about $1/10^{th}$, or from about $1/10^{th}$ to about $1/13^{th}$, or from about $1/11^{th}$ to about $1/13^{th}$, or from about $1/9^{th}$ to about $1/10^{th}$, or from about $1/12^{th}$ to about $1/13^{th}$ of the average length of the support structure from the inboard end to the outboard end.

The connection point or points of the top portion of the support structure to the buoyancy vessel may define a pull point or pull points of the turbine assembly for moving the turbine assembly between the first position and the second position. The connection point or points of the bottom portion of the support structure to the buoyancy vessel may define a pivot point or pivot points of the turbine assembly with respect to the buoyancy vessel.

Providing a low pivot point with respect to the pull point of the turbine assembly increases the mechanical advantage experienced at the pull point of the turbine assembly, thus minimising the force required to move the turbine assembly between the first position and second positions. This in turn enables the use of smaller engines. This also increases the flexibility for scalability of the apparatus. For example, it enables the use of bigger rotor blades than would otherwise have been possible to employ in apparatuses with turbine assemblies configured to move between different positions. Furthermore, lowering the hinge point of the turbine assembly may also have a beneficial effect on the roll stability of the power generating apparatus.

The connection point or points of the bottom portion of the support structure to the buoyancy vessel may be located at a distance from the baseline of the buoyancy vessel from about $1/18^{th}$ to about $1/4^{th}$ of the total perimeter of the buoyancy vessel. For example, the connection point or points of the bottom portion of the support structure to the buoyancy vessel may be located at a distance from the baseline of the buoyancy vessel of about $1/18^{th}$, or about $1/17^{th}$, or about $1/16^{th}$, or about $1/15^{th}$, or about $1/14^{th}$, or about $1/13^{th}$, or about $1/12^{th}$, or about $1/11^{th}$, or about $1/10^{th}$, or $1/9^{th}$, or about $1/8^{th}$ or about $1/7^{th}$, or about $1/6^{th}$, or about $1/5^{th}$ or about $1/4^{th}$ of the total perimeter of the buoyancy vessel.

In embodiments in which the power generating apparatus comprises two turbine assemblies symmetrically disposed about the buoyancy vessel, the connection point or points of the bottom portion of the first support structure may be separated from the corresponding connection point or points of the second support structure by a distance covering from about $1/7^{th}$ to about $1/2$ of the perimeter of the buoyancy vessel (distance measured between the two symmetrically disposed connection points along the underside of the buoyancy vessel). The connection point or points of the bottom portion of the first support structure may be separated from the corresponding connection point or points of the bottom portion of the second support structure by a distance covering from about $1/7^{th}$ to about $1/5^{th}$, or from about $1/6^{th}$ to about $1/4^{th}$, or from about $1/5^{th}$ to about $1/3^{rd}$ or from about $1/3^{rd}$ to about $1/2$, or from about $1/7^{th}$ to about $1/3^{rd}$, or from about $1/5^{th}$ to about $1/2$, or from about $1/6^{th}$ to about $1/3^{rd}$ of the perimeter of the buoyancy vessel. For example, symmetrically arranged connection point or points of two support structures to the buoyancy vessel may be separated by a distance covering about $1/7^{th}$, or about $1/6^{th}$, or about $1/5^{th}$, or about $1/4^{th}$, or about $1/3^{rd}$ of the total perimeter of the buoyancy vessel.

In some embodiments, the turbine assembly may be rotatably or slidably coupled to the buoyancy vessel. The turbine assembly may be coupled to a plate that is movable, rotatable or slidable about the contour of the buoyancy vessel. The top portion and/or the bottom portion may be slidably connected to the buoyancy vessel at one or more connection points. The distance of the connection point or points of the top portion and the connection point or points of the bottom portion to the buoyancy vessel with respect to the baseline of the buoyancy vessel may be variable. The vertical and/or horizontal distance between the connection point or points of the top portion and the connection point or points of the bottom portion to the buoyancy vessel may be fixed. The top portion may be movably coupled to the buoyancy vessel at a lower distance from the baseline of the buoyancy vessel than the bottom portion. In other words, the connection point or points of the bottom portion to the buoyancy vessel may be located at a greater distance from the baseline of the buoyancy vessel than the connection point or points of the top portion to the buoyancy vessel.

The top portion and/or the bottom portion may be indirectly connected to the buoyancy vessel. For example, the top portion and/or the bottom portion may be connected to a plate. The plate may be slidably coupled to the buoyancy vessel. In other words, the height of the plate with respect to the baseline of the buoyancy vessel may be variable. In some embodiments, the top portion may be connected (e.g. by welding or bolting) to the plate at one or more connection points. The bottom portion may be connected (e.g. by welding or bolting) to the plate at one or more connection points. The connection point or points of the bottom portion to the plate may be disposed above the connection point or points of the top portion to the plate. Alternatively, the connection point or points of the bottom portion to the plate may be disposed below the connection point or points of the top portion to the plate. It is to be understood that the terms top and bottom, above and below refer to the turbine assembly in its normal configuration (as one would observe when the power generating apparatus is floating on a body of water). The plate may be straight. The plate may be curved. In some embodiments, the plate is curved and conforms to the shape of the buoyancy vessel. For example, in embodiments in which the buoyancy vessel is substantially cylindrical, the plate may be curved or may be a section of a cylinder. The plate may be configured to move vertically with respect to the baseline of the buoyancy vessel. For example, when the power generating apparatus is in the first position, the plate may be disposed closer to the baseline of the buoyancy vessel than when the power generating apparatus is in the second position. The plate may be configured to move or slide with respect to the buoyancy vessel by any suitable means. For example, the plate may be configured to slide along guides. In some embodiments, the plate may be a bearing configured to rotate or slide around the buoyancy vessel.

In some embodiments the top portion of the support structure may comprise a main member that is connected to or extends from the nacelle at the outboard end to the inboard end, where it is movably connected to the buoyancy vessel. For example, the main member may be pivotally connected to the buoyancy vessel (whether directly or indirectly via a mechanical linkage) at a single connection point. The main member may be pivotally connected to an outboard end of a mechanical linkage and the mechanical linkage may be pivotally connected at its inboard end to the buoyancy vessel. The mechanical linkage may define two or more pivot points. The connection point to the buoyancy vessel of the mechanical linkage associated with the top portion of the support structure may be a pull point. Translational and/or rotational motion of the top portion with respect to the buoyancy vessel may occur as a result of pulling action by a powered mechanism (e.g. hydraulic ram and/or winch). In those embodiments, the bottom portion of the support structure may comprise a main member that is connected to or extends from the nacelle at the outboard end and which is branched such that at the inboard end of the support structure the bottom portion is connected to the buoyancy vessel (whether directly or indirectly) at two or more horizontally spaced locations. In those embodiments, the connection point of the top portion to the buoyancy vessel may be vertically and horizontally offset from the connection points of the bottom portion to the buoyancy vessel.

In some embodiments the bottom portion of the support structure may comprise a main member that is connected to or extends from the nacelle at the outboard end to the inboard end, where it is pivotally connected to the buoyancy vessel (whether directly or indirectly via a linkage) at a single connection point. In those embodiments, the top portion of the support structure may comprise a main member that is connected to or extends from the nacelle at the outboard end and which is branched such that at the inboard end of the support structure the bottom portion is pivotally connected to the buoyancy vessel (whether directly or indirectly) at two or more horizontally spaced locations. In those embodiments, the connection point of the top portion to the buoyancy vessel may be vertically and horizontally offset from the connection points of the bottom portion to the buoyancy vessel.

In some embodiments the top portion and/or the bottom portion of the support structure may comprise two or more main members that at the outboard end are connected to or extend from the nacelle towards the inboard end, where each main member is pivotally coupled to the buoyancy vessel at a horizontally spaced apart location. In those embodiments the top and/or bottom portion may define a substantially triangular shape.

The power generating apparatus may be manufactured from any suitable material, such as steel or low density materials. The support structure of the turbine assembly may be manufactured of any suitable material, such as steel, reinforced concrete, low density materials such as carbon fibre and the like.

In some embodiments only one of the top or the bottom portion of the support structure comprises two or more main members that at the outboard end are connected to or extend from the nacelle towards the inboard end of the support structure, where each main member is pivotally coupled to the buoyancy vessel at a horizontally spaced apart location. In those embodiments, the other of the top portion or the bottom portion of the support structure comprises a single main member that at the outboard end is connected to or extends from the nacelle and extends towards the inboard end. At the inboard end, the said main member is pivotally mounted (whether directly or indirectly) to the buoyancy vessel at a single point which is vertically and horizontally offset from the coupling points of the other of the top or bottom portion main members to the buoyancy vessel.

In some embodiments the bottom portion of the support structure comprises a single main member that is connected to or extends from the nacelle at the outboard end of the support structure and runs towards the inboard end of the support structure. The single main member of the bottom portion may be branched at one or more points between the inboard end and the outboard end of the support structure. In other words, the bottom portion may comprise a main member (e.g. a main stem or tube) integral with or connected to the nacelle at the outboard end of the support structure and two or more branches or portions diverging from the main member towards the inboard end of the support structure and being longitudinally spaced apart. The two or more branches may be pivotally coupled to the buoyancy vessel at horizontally spaced apart locations. Each of the two or more branches may be pivotally coupled to the buoyancy vessel at a hinge point (e.g. as discussed above). In those embodiments, the top portion of the support structure may comprise a single main member that at the outboard end is connected to or extends from the nacelle and extends towards the inboard end. At the inboard end, the said main member may be operatively coupled to the buoyancy vessel at a single point which is vertically and horizontally offset from the coupling points of the bottom portion to the buoyancy vessel. The main member of the top portion may be operatively coupled to the buoyancy vessel by a hydraulic ram. A hydraulic ram may be operatively connected between one or other of the top portion of the support structure and the buoyancy member by a mechanical linkage arrangement, wherein the mechanical linkage arrangement is coupled at a first end to the top portion of the support structure and at a second end to the buoyancy vessel.

Without wishing to be bound by theory, providing multiple connection points of the support structure to the buoyancy vessel which are vertically and/or horizontally offset from each other may provide a better distribution of the load on the buoyancy vessel and a better grip. Horizontal spacing of the connection points of the support structure to the buoyancy vessel provides mechanical advantage for resisting the thrust force. Vertically spacing the connection points of the support structure to the buoyancy vessel provides mechanical advantage for moving the turbine assembly between the first and second positions. Providing a support structure having an open structure (e.g. an open frame) allows increasing of the spacing between connection points using a minimum amount of material/structure. This in turn also minimises the weight of the support structure without compromising its mechanical stability to support the turbine and nacelle.

The support structure may have any suitable shape. For example the support structure may have a substantially triangular shape, or a substantially rectangular shape, or an arcuate shape (e.g. a wing shape or a seagull wing shape), or the like.

In embodiments in which the power generating apparatus comprises a winch as a powered mechanism to move the turbine assembly between the first and second positions, the turbine assembly may comprise a winch anchor point. The winch anchor point may be located anywhere along the turbine assembly. For example, the winch anchor point may be located on the support structure or on the nacelle. The winch anchor point may be located on the top portion or the bottom portion of the power generating apparatus. The winch anchor point may be configured to be connected to a winch line or cable associated with the winch in order to move the turbine assembly between the first and second positions. In embodiments in which the winch anchor point is located on the support structure, the winch anchor point may be located on the highest point of the support structure (viewed when the support structure is in the second position). For example, in embodiments in which the top portion or the bottom portion of the support structure comprises or defines an apex, the winch anchor point may be located on the apex. The apex of the top portion or the bottom portion comprising a winch anchor point may be a gin pole.

Without wishing to be bound by theory, elevating the winch anchor point above the support structure may result in the winch line (e.g. cable associated with the winch) being substantially horizontal (or perpendicular to the longitudinal axis of the buoyancy vessel) when the turbine assembly is in the second position. This in turn minimises the tension required in the winch line. Providing a winch anchor point on the support structure enables the winch anchor point to be both higher and closer to the buoyancy vessel. This in turn makes the winch anchor point more easily reachable (e.g. from a platform of the power generating apparatus), and to improve the lift moment.

In embodiments in which the power generating apparatus has two turbine assemblies symmetrically disposed about the buoyancy vessel, the turbine assemblies may be configured to react against each other and employ the bow string effect for the final part of the lift from the first position to the second position. For the avoidance of doubt, the bow string effect occurs where a very high tension can be generated in a line by pulling perpendicular to it, e.g. when tensioning a bow to fire an arrow.

Employing the bow string effect to lift the turbine assemblies to the second position is beneficial since the maximum force required during the lifting of the turbine assemblies to the second position is when they approach the horizontal. The force required to be applied to lift the turbine assemblies is dramatically reduced if applied in the downwards direction. Therefore, employing the bow string effect for lifting the turbine assemblies to the second position permits to stop using the powered lift mechanism when the turbine assemblies are close to the second position and to have a second lifting stage which involves reacting the legs off one another. The bow effect can be applied in any embodiments employing a powered mechanism, for example a winch and/or a ram and associated mechanical linkage.

The top portion and the bottom portion may be connected to each other at one or more points. The top portion and the bottom portion may be connected to each other at or close to the outboard end of the support structure. For example, the top portion and the bottom portion may be connected to each other at the nacelle, and/or at a location near the nacelle. The top portion and the bottom portion may be connected to each other at or close to the inboard end of the support structure. The top portion and the bottom portion may be connected to each other at one or more points along the length of the support structure from its inboard end to its outboard end. For example, the top portion and the bottom portion may be connected to each other at or near the outboard end and at or near the inboard end of the support structure. Additionally or alternatively, the top portion and the bottom portion may be connected to each other at one or more locations along the length of the support structure between the outboard end and the inboard end of the support structure.

The top portion and the bottom portion may be connected to each other by any suitable means. For example, the top portion and the bottom portion may be connected to each other by one or more struts. The one or more struts may be disposed between and connected to or integral with the top portion and the bottom portion. The one or more struts may be any suitable structure, such as a shaft, leg, prop or the like. Top portion, the bottom portion and the one or more struts may be integral. Alternatively, top portion, the bottom portion and the one or more struts may be separate structures coupled together by any suitable means. For example, the top portion, the bottom portion and the one or more struts may be coupled together by welding or bolting.

The top portion, the bottom portion and optionally the one or more struts of the support structure may define an open support structure. Advantageously, providing an open support structure may reduce the weight of the support structure compared to a closed support structure. The force required (e.g. by a powered actuation system) to raise the turbine assembly is driven by the weight of the support structure and the weight of the nacelle and rotor blades. In the second position where the turbine assembly remains fully submerged, the weight that an actuation mechanism needs to lift to move the apparatus to the first position is the net weight in water (i.e. weight of the turbine assembly in air minus buoyancy). If part of the turbine assembly breaches the water surface then the actuation mechanism needs to lift the weight of the turbine assembly in air. In embodiments in which the turbine assembly breaches the water surface to fully raise the leg, the lower weight in air of an open support structure compared to a closed support structure would result in lower peak loads for the actuation system. This may facilitate the actuation of the turbine assembly between the first position and second position.

In addition, given that the weight of the support structure may be reduced by making it open, power generation apparatuses according to the invention may be coupled to larger turbine rotors and/or nacelles. The overall weight of the turbine assembly may be substantially maintained or increased only moderately even with a lager rotor because the reduced weight of the support structure may compensate for the increased weight of the rotor. Therefore the power generating apparatus of the invention may be capable of maximising the energy that can be harvested from water currents.

A reduction of the weight of the support structure of the turbine assembly may result in an overall reduction of the weight of the apparatus (particularly in embodiments with two or more turbine assemblies). Furthermore, lighter open support structures may enable devices according to the invention to lift the turbine assembly further out of the water than closed support structures. This in turn may reduce the drag and/or enable larger freeboard of the nacelle when its lifted, thus making access into the nacelle possible in a larger weather window. Even if part of the turbine assembly remains in the water in the first position, providing an open structure allows water to flow through the support structure, also minimising drag while the apparatus is being towed between locations. These features enable the use smaller barges or tow boats to tow the apparatuses between locations, thus reducing the operational costs.

The open structure of the support structure of the turbine assemblies of the invention has an increased structural member to space ratio than turbine assemblies with closed structure. This in turn results in greater flexibility for scaling the entire apparatus up, or of maintaining the overall scale of the apparatus while employing larger turbines. Moreover, open frame support structures may require less material than closed frame support structures and therefore, the manufacture and transport costs can be minimised.

Furthermore, providing an support structure having an open structure in the direction of the water flow allows water to flow through the support structure, thus minimising the disturbance of the water flow induced by the support structure of the turbine assembly when the turbine assembly is in the second position. This is of particular importance around the area which in use is swept by the moving rotor blades. The water flow encountering a support structure submerged under water is disturbed by the presence of the support structure, causing a reduction in the flow velocity immediately behind the support structure. This is known as tower shadow. In subsea power generation apparatuses comprising turbines, the slower flow causes the loads on the blades of the turbines to fluctuate as they pass through the region of slow flow. The main effect of this load fluctuation is increased fatigue loads on the blades/rotor/leg, and in some cases an increase of the extreme loads experienced by the turbines. This effect is particularly acute in tidal power generation apparatuses, since the blades of the turbines operate downstream on the support structure for half of the time (i.e. when the tide goes up or down). Advantageously, the open support structure of power generating apparatuses according to the invention minimises the shadow effect from the support structure on the rotor blades as the water current moves them, thus maximising the energy that can be harnessed, for example from tidal or river currents.

The open support structure of the invention is particularly advantageous in embodiments comprising a two-bladed turbine, since the shadow effect is particularly acute for this type of turbines, as it causes a fluctuation in blade and rotor loads twice per revolution. In two-bladed rotors, when one blade is disposed behind the support structure or tower (i.e. in shadow), 50% of the available blades experience reduced loads, compared to the situation experienced by three-bladed turbines where one blade represents only 33% of total rotor loads). Therefore, minimising the shadow effect for two-bladed rotors is highly desirable in order to maximise the power harnessing capability of the apparatus.

Providing power generation apparatuses according to the invention having an open support structure enables a significant reduction of the width of the support structure around the turbine and enables a more complex optimisation of the geometry of the components (e.g. main members, branched members, struts and the like) of the open structure.

Without wishing to be bound by theory, the open support structure of the turbine assembly of the invention may present decreased buoyancy compared to closed frame support structures. Decreasing the buoyancy of the support structure results in raising the centre of buoyancy and the metacentre of the apparatus, and therefore result in an increase of the roll stiffness of the power generation apparatus.

Furthermore, power generating apparatuses having closed support structures tend to present large projected areas of the support structures. These areas can catch unsteady drag and lift loading from turbulence in the tide. Since the total surface of the open support structure of the apparatus of the invention is lower than in closed frame arrangements, the power generation apparatus of the invention may have improved roll stability.

The open support structure may be hydrodynamically shaped. That is, the structural components of the open support structure of the turbine assembly (e.g. the main member or members, the strut or struts and optionally the branched member or members) may be hydrodynamically shaped. For example, the structural components of the open support structure of the turbine assembly may define a wing or sail shape or profile. In other words, the structural components of the open support structure of the turbine assembly may be shaped as hydrofoils. In some embodiments, the structural components of the open support structure of the turbine assembly may be moveable. For example, the structural components of the open support structure (e.g. the main member or a portion thereof, the strut or struts where present and optionally the one or more branched members of the top portion and/or the bottom portion of the support structure) may be moved about a variable pitch angle. The pitch angle may be actively variable to resist roll. This would act like a fin stabiliser on a ship. Alternatively, the structural components of the open support structure may fixed in position (e.g. passive system).

A hydrodynamically shaped open support structure may be shaped such that the load transfer to the buoyancy vessel is optimised. The hydrodynamically shaped open support structure may be angled in order to produce lift in the upwards direction (i.e. towards the water surface). The lift assists in the movement of the turbine assembly from the first position to the second position by alleviating the gravity loads due to the weight of the nacelle. In addition, lift also counters gravity loads when the turbine assembly is held stationary in the first and/or second position. The pitch angle of the foils to resist the torque from the rotors as well as the gravity load may be varied actively or passively. The support structure may comprise an active system to alter the pitch of the hydrodynamically shaped open support structure. The support structure may be shaped as a hydrofoil and may comprise an active system to alter the pitch of the hydrofoil.

The blade or sail shape of the structural components of the support structure may minimise disturbance of water flow around the support structure. This in turn may minimise turbulence around the rotor blades, thus further reducing the shadow effect experienced by the rotor blades as a consequence of having a structure behind them (compared with support structures with different shapes, such a cylindrical open frame support structures).

Furthermore, the hydrodynamically shaped open support structure may benefit from lift generated by the support structure to resist roll motion. Moreover, hydrodynamically shaped open support structures minimise the drag while the power generating apparatus is being towed.

The power generating apparatus may typically comprise various additional apparatus. The skilled addressee will also appreciate that the location or distribution of such additional apparatus may be varied without departing from the scope of the invention.

For example, the power generating apparatus may comprise apparatus as required to harvest energy, to convert this into electrical energy and/or to transform, store and/or transmit such electrical to an electrical distribution system.

The power generating apparatus may also comprise apparatus required to vary buoyancy, by selectively flooding and venting ballast tanks.

A turbine assembly, or its nacelle and/or support structure, may comprise one or more ballast tanks.

The power generating apparatus may comprise a conduit for delivering air to a ballast tank (to increase buoyancy). In order to flood a ballast tank, the power generating apparatus may comprise an inlet or inlet conduit between the surrounding water and the ballast tank. In order to flood/vent a ballast tank, the apparatus may comprise a vent conduit or vent manifold to selectively release air/water from the ballast tank. An outlet of the vent conduit/manifold may be positioned above the water surface.

The apparatus means for delivering air to and/or pumping water from, a ballast tank is most typically situated on the buoyancy vessel. Such apparatus may comprise for example a source of compressed air (e.g. a cylinder or a compressor), or connections for connecting thereto. Selectively operable valves for operating a variable buoyancy system may be located on the buoyancy vessel. Such apparatus may comprise one or more pumps.

The nacelle may comprise an electrical generator. Advantageously, this may be an in-line generator, optionally a direct-drive generator (i.e. lacking a gearbox). The generator may be any suitable type of generator; most typically comprising an electrical rotor and stator, the electrical rotor typically being driven by the turbine rotor. Electricity may alternatively also be generated indirectly from fluid circulated under the action of the turbine rotor.

It may be desirable for the turbine rotor to comprise variable-pitch rotor blades. For example, feathering the rotor blades during storm conditions may reduce loads applied through the turbine assembly and prevent damage.

Accordingly, the nacelle (and/or the turbine rotor in particular) may comprise a pitch adjustment arrangement. Various means are known in the art for adjusting turbine blade pitch, both in relation to wind and marine/water turbines. For example, the turbine rotor may comprise a rotor blade (or blades) rotatably mounted to a hub around an axis along the rotor blade, the pitch being adjustable by way of a worm gear or a pinion coupled to a planary gear or slew ring.

The pitch adjustment arrangement may be electromechanically actuated. The pitch adjustment arrangement may be housed in the rotor. Examples of turbine blade pitch adjustment are described in GB996182, CN202266366 or GB2348250 or WO2009004420, to which the skilled reader is directed.

The turbine rotor may be configured to reverse the pitch of the rotor blades. The rotor blades may be rotatable through 180 degrees or 360 degrees. The facility to reverse the pitch of rotor blades may enable energy to be harvested regardless of the direction of the water flow, without changing the position of the power generating apparatus as a whole. The pitch may be revered so as to harvest energy when the direction of a tidal stream changes. It may also be desirable to adjust the pitch in response to variations in water flow.

The power generating apparatus is typically anchored in its final position. Any suitable anchoring arrangement may be employed, for example conventional cables between an anchoring structure (typically a concrete block) on the bed of a body of water, and suitable fixings at or near one or both ends of the buoyancy vessel. Also suitable is a rotatable anchor such as described in EP2300309 (Scotrenewables Tidal Power Limited).

According to a second aspect of the invention there is provided a turbine assembly for a power generating apparatus according to the first aspect, the turbine assembly comprising a turbine rotor mounted to a nacelle, and support structure;

the support structure being configured to be coupled at its inboard end to the buoyancy vessel at at least two vertically spaced connection locations and coupled at its outboard end to the nacelle;

the support structure comprising an open structure defining at least one void configured to provide a trough for water to flow through;

when coupled to a said buoyancy vessel in use, the turbine assembly being pivotally moveable between a first position and a second position.

All the features of the turbine assembly described in respect of the first aspect of the invention apply also to the second aspect of the invention.

It is to be understood that reference herein to the water surface, and references thereto components being submerged or above the water surface, refer to the power generating apparatus when floating on a body of water.

Moreover, the precise position of the water line (i.e. water surface in relation to the power generating apparatus) may depend on water salinity, temperature, loading on the vessel and the like. The position of the water line of a buoyant apparatus may be readily determined by those skilled in the art, by observation or calculation.

Preferred and optional features of each aspect of the invention correspond to preferred and optional features of each other aspect of the invention.

DESCRIPTION OF THE DRAWINGS

Example embodiments of the invention will now be described with reference to the following drawings in which:

FIGS. 3A and 3B show a schematic front view of an embodiment of the power generating apparatus of the invention in the first position and the second position respectively.

DETAILED DESCRIPTION OF EXAMPLE EMBODIMENTS

Figure 1B:
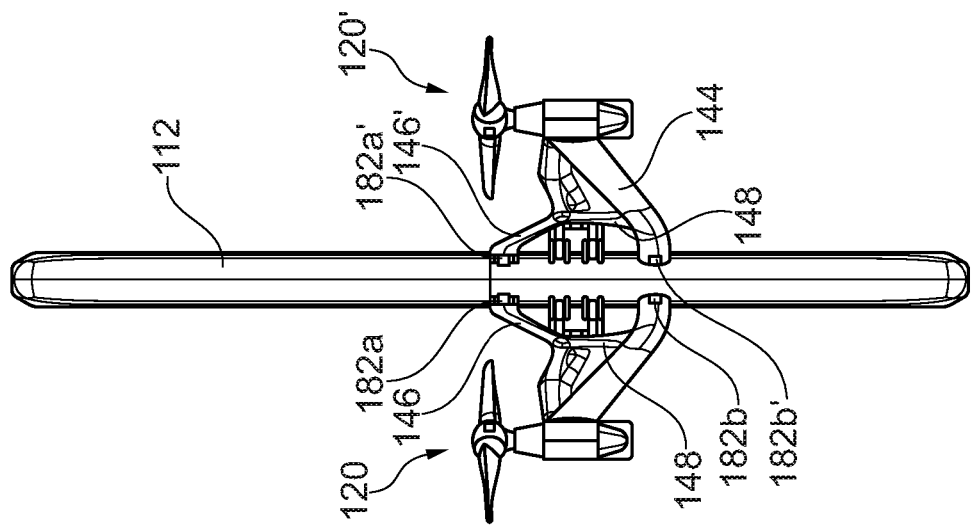
FIG. 1B shows a bottom view of the power generating apparatus of FIG. 1A.

As shown in FIG. 1, a power generating apparatus 100 according to the invention comprises a buoyancy vessel 110 with a platform or deck 190 and comprises two turbine assemblies 120 symmetrically disposed about the longitudinal axis of the buoyancy vessel 110. In this embodiment the turbine assemblies 120 are movably coupled to the buoyancy vessel 110 closer to one of the stern or bow section of the buoyancy vessel. In FIG. 1 the turbine assemblies 120 are shown in the first position in which the nacelle 130 is configured to be fully submerged below the waterline when the power generating apparatus is floating on a body of water.

Each turbine assembly 120 comprises a turbine rotor 135 having two blades mounted to a nacelle 130. The nacelle is integral with or fixedly connected to the outboard end of a support structure 140 (e.g. bolted or welded thereto). The inboard end of the support structure 140 movably coupled to the buoyancy vessel 110 as described below.

The support structure 140 comprises a top portion and a bottom portion which are vertically spaced apart and define an open structure through which water can flow. The top portion and the bottom portion are connected to each other by struts 148 disposed between and connected to or integral with the top portion and the bottom portion. The struts 148 can be connected to the top portion and the bottom portion by any suitable means. For example, the struts may be bolted or welded to the top portion and the bottom portion, or they may be integral with one or both of the top portion and/or bottom portion, or may be movably connected to the top portion and bottom potion of the support structure 140 so as to allow relative movement, for example to adjust the pitch of the different components of the support structure.

The bottom portion comprises a main member 144 that runs from the inboard end to the outboard end of the support structure 140 and a branched member 146 which extends from or is connected to the main member 144 and is horizontally spaced apart from the main member 144.

The turbine assemblies are pivotally coupled to the buoyancy vessel 110 at multiple locations 182a, 182b, and 184. The branched member 146 and the main member 144 are pivotally connected to the buoyancy vessel 110 in a horizontally spaced arrangement. The branched member 146 and the main member 144 of the bottom portion are coupled to the buoyancy vessel 110 by means of a hinge arrangement, for example a pin-joint 182a,b. Therefore, the bottom portion of the support structure is connected to the buoyancy vessel at two horizontally spaced pivot points by means of two hinges 182a, 182b arranged along an axis that is substantially parallel to the longitudinal axis of the buoyancy vessel 110. The connection points of the bottom portion of the support structure 140 to the buoyancy vessel 110 are located on the lower half of the buoyancy vessel 110 and are configured to remain below the waterline the apparatus floating on a body of water.

The top portion of the support structure 140 comprises a main member 142 is connected to or extends from the nacelle at the outboard end to the inboard end of the support structure (e.g. it may be bolted or welded thereto, or integral therewith) to the outboard end of the support structure. The top portion is movably connected to the buoyancy vessel 110 by means of a ram 170 and associated linkage mechanism 160.

The main member 142 of the top portion is pivotally coupled to the buoyancy vessel 110 at one location 184 disposed closer to the waterline than the two pivot points 182a, 182b at which the bottom portion of the support structure is pivotally coupled to the buoyancy vessel 110. The connection point 184 between the buoyancy vessel 110 and the mechanical linkage 160 associated with the ram 170 and the top portion of the support structure remains above the waterline, but is disposed at a height close to said waterline. The inboard end of the mechanical linkage 160 is pivotally connected to the buoyancy vessel 110 at hinge 184. The outboard end of the mechanical linkage 160 is pivotally connected to the main member 142 of the top portion.

The connection point 184 of the top portion of the support structure 140 to the buoyancy vessel 110 is vertically and horizontally offset from the connection points 182*a* and 182*b* of the bottom portion of the support structure 140 to the buoyancy vessel 110. In this embodiment, the connection point 184 is disposed above the connection points 182*a*, 182*b* of the bottom portion of the support structure 140 and at a location along the longitudinal axis of the buoyancy vessel that is between the locations of connection points 182*a*, 182*b* of the bottom portion to the buoyancy vessel 110.

The connection points 282*a*, 2282*b* of the bottom portion of the support structure to the buoyancy vessel 210 are vertically separated from the connection point or points of the top portion of the support structure to the buoyancy vessel by a distance of from about to 50% to about 100% of the total height of the buoyancy vessel. The connection points 282*a*, 2282*b* of the bottom portion of the support structure to the buoyancy vessel 210 are spaced along the length of the buoyancy vessel by a distance of between from about $1/13^{th}$ and to about $6^{th}$ of the total length of the buoyancy vessel.

The connection point 184 of the top portion of the support structure 140 to the buoyancy vessel 110 defines a pull point of the turbine assembly 120 for moving the turbine assembly 120 between the first position and the second position. The connection points 182*a*, 182*b* of the bottom portion of the support structure 140 to the buoyancy vessel 110 define two pivot points of the turbine assembly 120 with respect to the buoyancy vessel 110.

Providing low pivot points with respect to the pull point of the turbine assembly increases the mechanical advantage experienced at the pull point 184 of the turbine assembly, thus minimising the power required to move the turbine assembly between the first position and second positions. This in turn enables the use of smaller engines. This also increases the flexibility for scalability of the apparatus. For example, it enables the use of bigger rotor blades than would otherwise have been possible to employ in apparatuses with turbine assemblies configured to move between different positions. Furthermore, lowering the hinge point of the turbine assembly may also have a beneficial effect on the roll stability of the power generating apparatus.

The open structure of the support structure 140 enables greater horizontal spacing between adjacent connection points 182*a* and 182*b* than would be possible for a closed structure. Horizontally spacing out the pivot connection points 182*a* and 182*b* of the bottom portion of the support structure to the buoyancy vessel 110 increases the mechanical advantage of the support structure 140 for resisting the thrust force experienced at the turbine assembly 120.

Therefore, this coupling arrangement assists with the lift of the turbine assembly from the first position to the second position and the dampening of the turbine assembly from the second position to the first position. Open support structures also provide greater flexibility for optimisation of the load paths of the support structure 140 on the buoyancy vessel 110 by determining the optimal location of the connection points of the support structure to the buoyancy vessel. This in turn allows apparatuses according to the invention to resist the thrust force and maximise the mechanical advantage for effecting the movement between the first and second positions of the turbine assembly.

The support structure 140 of the turbine assemblies of this embodiment is an open structure. The structure is open from the top (i.e. when the power generating apparatus is viewed from above in normal use, as can be better seen in FIG. 1C) and is open from the front (i.e. when the power generating apparatus is viewed along the longitudinal axis of the buoyancy vessel, as can be better seen in the embodiments of FIGS. 5A and 5B and FIG. 9).

Figure 1A:
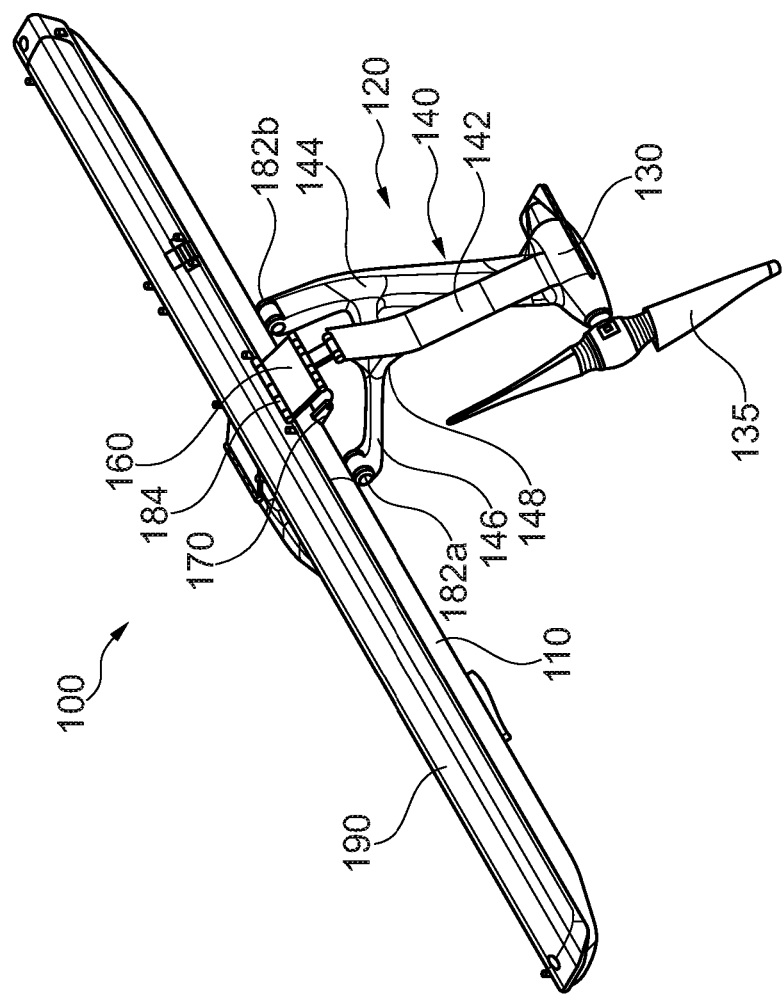
FIG. 1A shows a perspective view of a power generating apparatus according to the invention.

FIG. 1B shows a bottom view of the power generating apparatus of FIG. 1A. In this figure the connection points of the bottom portion support structure 140 to the buoyancy vessel 110 are better observed. As seen in this figure, the connection points 182*a* and 182*b* of the bottom portion of the support structure 140 to the buoyancy vessel 110 are located at a distance from the baseline 112 of the buoyancy vessel from about $1/14^{th}$ to about $1/8^{th}$ of the total perimeter of the buoyancy vessel. The connection points 182*a* and 182*a*' and 182*b* and 182*b*' of the two support structures 140, 140' are disposed close to each other, being separated by a distance covering from about $1/7^{th}$ to about $1/2$ of the perimeter of the buoyancy vessel (distance measured between the two symmetrically disposed connection points along the underside of the buoyancy vessel 110).

Figure 1C:
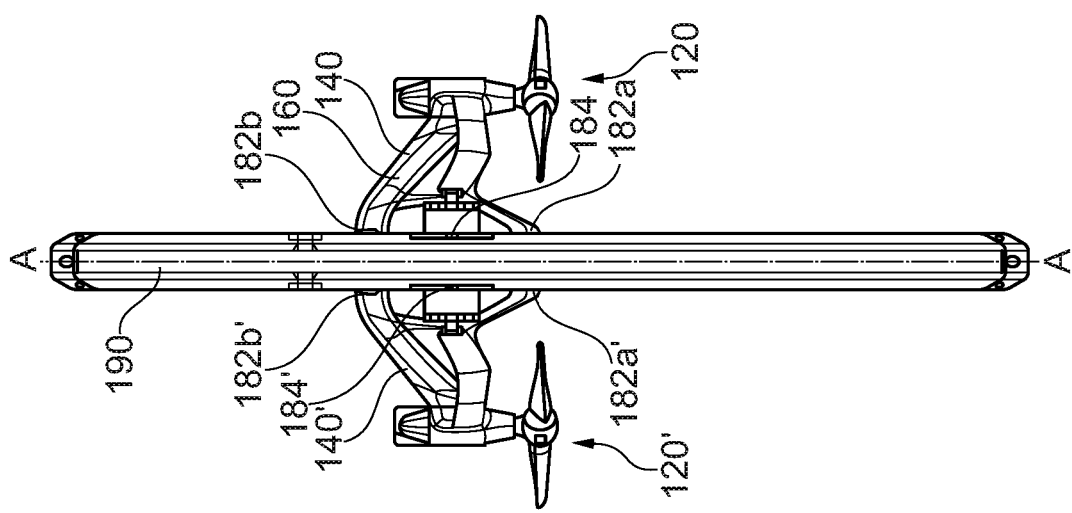
FIG. 1C shows a top view of the power generating apparatus of FIG. 1A in the second position.

FIG. 1C shows a top view of the apparatus of FIGS. 1A and 1B in the second position. In this figure it can be appreciated how the two turbine assemblies 120, 120' are disposed symmetrically about the longitudinal axis of the buoyancy vessel 110, which is defined by the line A-A. In this figure it is also possible to appreciate that the coupling arrangement of the turbine assemblies 120, 120' to the buoyancy vessel (not shown as it is covered by platform 190) does not disturb the platform or deck 190 that is usable to walk along the buoyancy vessel, even when the mechanical linkage 160 and ram (not visible in this view) are lifted in the second position. In FIG. 1C is also possible to appreciate how the turbine assemblies 120, 120' are coupled to the buoyancy vessel at multiple points 184, 182*a*, 182*b* that are horizontally offset, and how the pivot points 182*a* and 182*b* (182*a*' and 182*b*') of the bottom portion of the support structures 140, 140' are spread along the longitudinal axis of the buoyancy vessel.

Figure 2A:
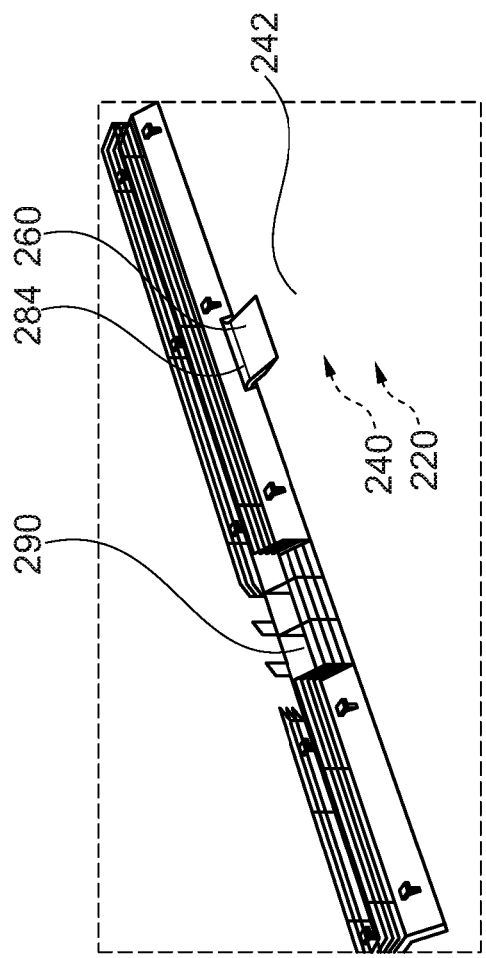
FIGS. 2A and 2B show a perspective view a power generating apparatus according to the invention viewed from the top when floating in a body of water with the turbine assembly in the first position and in the second position respectively.
Figure 2C:
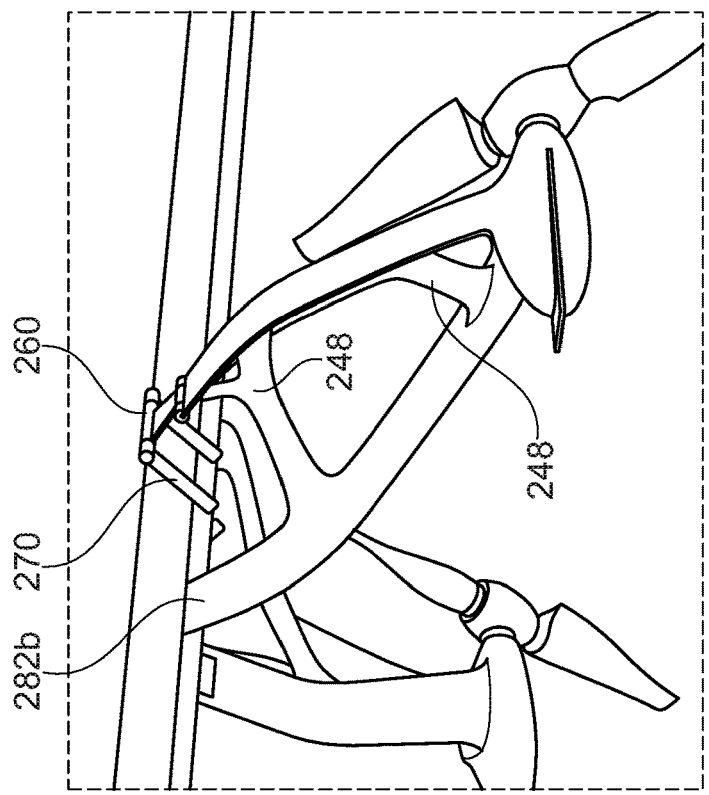
FIG. 2C shows a perspective view of the apparatus of FIGS. 2A an 2B viewed from the bottom when floating in a body of water with the turbine assembly in the first position.
Figure 2B:
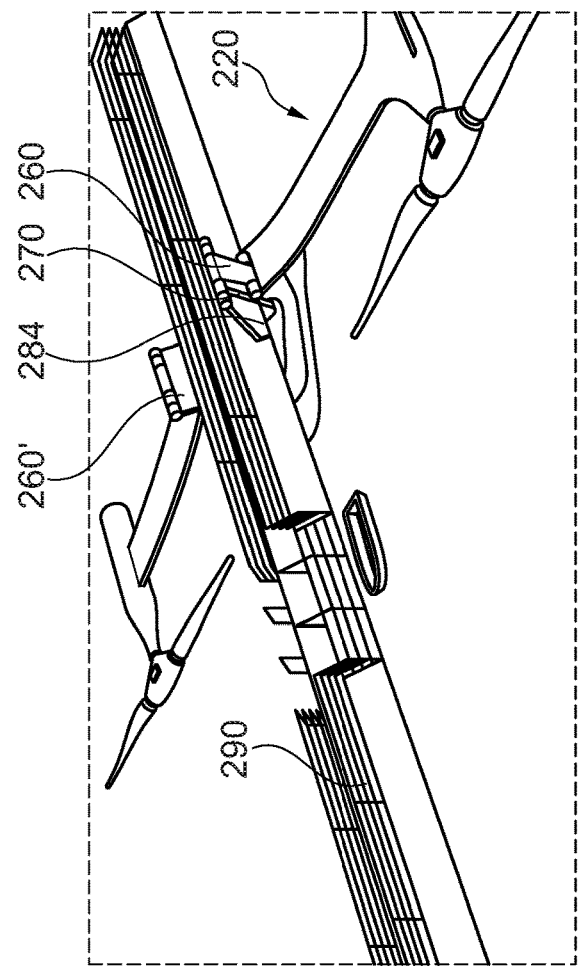

FIGS. 2A and 2B show a perspective view of a power generating apparatus according to the invention viewed from the top when floating in a body of water with the turbine assembly in the first position and in the second position respectively. Features in common with the power generating apparatus of FIG. 1 are provided with like reference numerals, incremented by 100. As shown in FIG. 2A, when the power generating apparatus 200 has the turbine assemblies 220 in the first position the connection point 284 of the mechanical linkage 260 associated with the top portion 242 of the support structure 240 and the ram 270 may remain above the waterline but close to the waterline. However, when the power generating apparatus is generating power from water currents the buoyancy vessel 210 may roll or develop a trim and get partially submerged at the bow or stern end due to the thrust on the turbine blades 235. This arrangement enables a wide deck 290 to be disposed on the buoyancy vessel and the connection point 284 of the mechanical linkage 260 to the buoyancy vessel to be hidden below the deck. When the power generating apparatus 200 has the turbine assemblies 220 in the second position, the distance between the first and second ends of the mechanical linkage arrangement 160 is decreased by operation of the hydraulic ram 270, effectively pulling the turbine assemblies 220 to the second position. As seen in FIG. 2B, this coupling arrangement enables the deck 290 to be uninterrupted by the ram 270 and associated mechanical linkage 260.

As seen in FIGS. 2A and 2C, the first link of the mechanical linkage 260 in the first position is submerged under water, while the connection point of the inboard end of the mechanical linkage 260 to the buoyancy vessel 210 remains above the waterline but close to it. As seen in FIG. 2A, when the turbine assembly 220 is in the first position, the connection point of the mechanical linkage 260 to the buoyancy vessel 210 is close to the waterline but remains above it The top portion of the support structure 240 is lifted above the waterline while at least part of the bottom portion of the support structure 240 remains below the waterline in the second position of the turbine assembly 220. The struts 248 connecting the top portion and the bottom portion of the support structure 240 are best observed in FIG. 2C.

FIGS. 3A and 3B show a schematic front view of an embodiment of the power generating apparatus 300 of the invention in the first position and the second position respectively. Features in common with the power generating apparatus of FIG. 1 are provided with like reference numerals, incremented by 200.

In these figures it is possible to appreciate how the entire turbine assembly remains below the waterline depicted by the line B-B. In the first position, the turbine assembly extends at least partially above the water surface, but a portion (e.g. the bottom portion) of the support structure may remain below the water surface in the second position. The power generating apparatus 300 has two turbine assemblies 320 comprising a support structure 340 and a nacelle 330. The support structures 320 are open structure with a top portion and a bottom portion. The top portion of the support structure 320 is connected to the nacelle 330 at its outboard end and to the buoyancy vessel at its inboard end by means of a mechanical linkage 360, which is associated with a ram 370. The mechanical linkage is connected at its outboard end 314 to the inboard end of the top portion, and it comprises two links which are pivotally connected at pivot point 314. Pivot point 314 is also coupled to ram 370. Ram 370 is further coupled o the buoyancy vessel by means of brackets 372. The inboard end 316 of mechanical linkage 360 is pivotally coupled to the buoyancy vessel 310 at point 384. In FIG. 3A it is shown that in the first position of the turbine assemblies 320, the entire ram 370 and the first link of mechanical linkage 360 including pivot point 314 remain below the waterline B-B. In the second position shown in FIG. 3B it can be seen how the angle of the rams 370 has changed becoming substantially perpendicular to the longitudinal axis of the buoyancy vessel. The distance between the first and second links of the mechanical linkage 360 has decreased compared to the configuration in the first position shown in FIG. 3A. The top portion 342 of the support structure 340 as well as the mechanical linkage 360 remain above the waterline B-B, while the bottom portion 344 of the support structure 340, including the pivot point 382 at which the bottom portion 344 is connected to the buoyancy vessel 310 remain below the waterline B-B.

Figure 4:
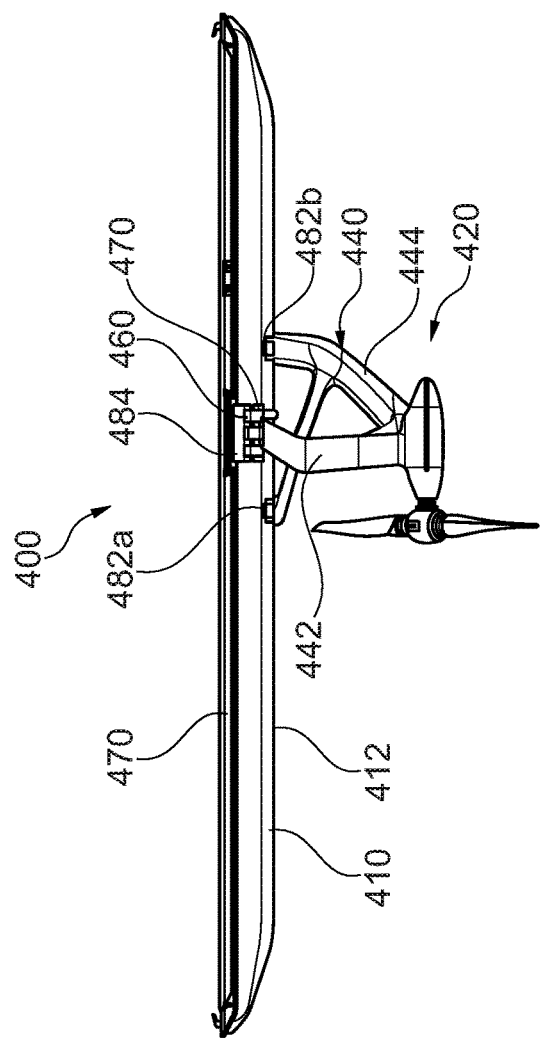
FIG. 4 shows a side view of an embodiment of a power generating apparatus according to the invention with the turbine assembly in the first position.

FIG. 4 shows a side view of an embodiment 400 of a power generating apparatus according to the invention with the turbine assembly in the first position. Features in common with the power generating apparatus of FIG. 1 are provided with like reference numerals, incremented by 300. The apparatus 400 has a turbine assembly 420 having an open support structure. In this figure is possible to observe how the connection point 484 of the top portion to the buoyancy vessel 410 (via the mechanical linkage 460 associated to the ram 470) is vertically and horizontally offset from the connection points 428a, 428b of the bottom portion 444 of the support structure 440 to the buoyancy vessel 410. The connection points 482a, 482b of the bottom portion to the buoyancy vessel 410 are located in the bottom half of the buoyancy vessel (below a horizontal cross-sectional plane containing the longitudinal axis of the buoyancy vessel 410), near its baseline 412, while the connection point 484 of the top portion of the support structure 440 is located on the upper half of the buoyancy vessel 410. The connection points 482a, 482b of the bottom portion to the buoyancy vessel 410 are horizontally spaced apart.

Figure 5:
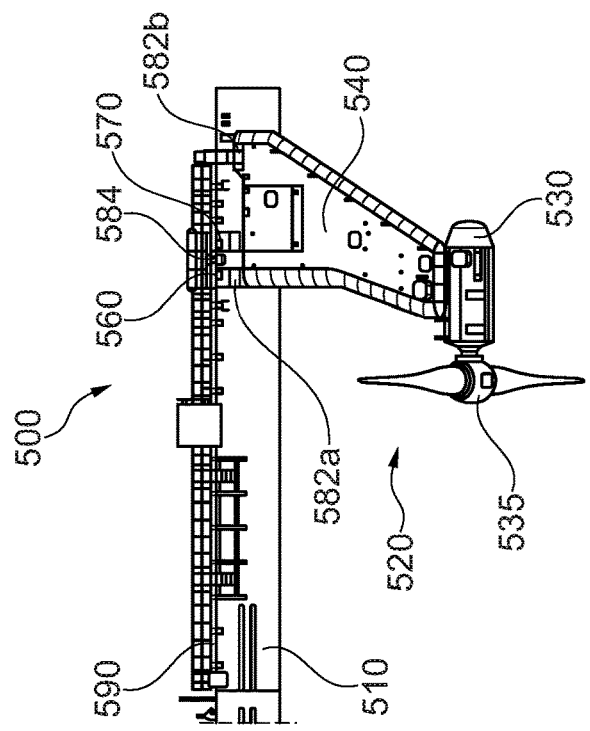
FIG. 5 shows a side view of a prior art power generating apparatus in a similar position to that shown in FIG. 4.

In contrast, FIG. 5 shows a side view of a prior art power generating apparatus disclosed in EP3559440. The apparatus 500 of FIG. 7 has a turbine assembly 520 having an closed support structure 540, a nacelle 530 having a turbine 535. In contrast with the embodiment of FIG. 4, the support structure 540 is connected to the buoyancy vessel 510 at a higher position within the buoyancy vessel (all the connection points of the support structure to the buoyancy vessel are located in the upper half of the buoyancy vessel, or above a horizontal cross-sectional plane containing the longitudinal axis of the buoyancy vessel). The open structure of the support structure 440 enables greater spacing between consecutive pivot points than the closed structure of support structure 540, as heavier weights need to be withstood. It also enables to reduce the power of the powered mechanism for moving the turbine assemblies between the first and second positions (e.g. reduce the size of the hydraulics). Therefore, as discussed above, power generating apparatus 400 has a mechanical advantage over power generating apparatus 500 for moving the turbine assembly 420 between the first and second positions, in addition, the apparatus 400 may present less drag than apparatus 500 when being towed between locations. The manufacturing costs of apparatus 400 may be minimised compared with apparatus 500 as less material may be required. The open structure of the support structure 440 of apparatus 400 reduces the shadow effect experienced at the turbine 435 compared to that experienced by turbine 535 in apparatus 500. In addition, the support structure of apparatus 400 is hydrodynamically shaped to provide minimal drag, shadow effect and enable the optimisation of the load transfer to the buoyancy vessel.

Figure 6:
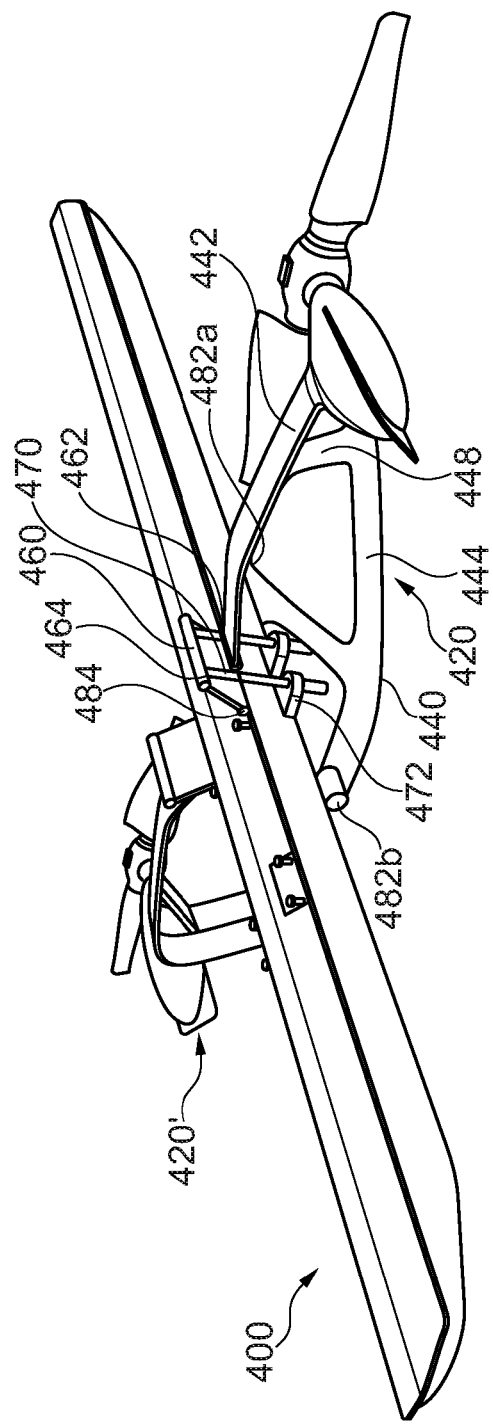
FIG. 6 shows a perspective view of a portion of the apparatus of FIG. 4 in the second position.
Figure 7:
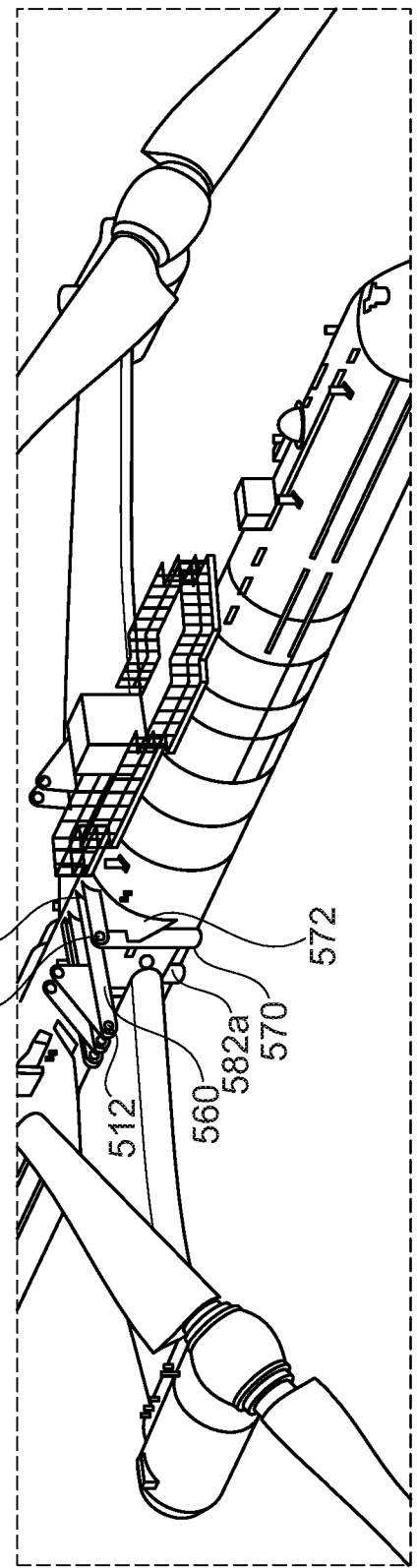
FIG. 7 shows a perspective view of a portion of the apparatus of FIG. 5 with the turbine assembly in the second position.

FIG. 6 shows a perspective view of a portion of the apparatus of FIG. 4 in the second position. FIG. 7 shows a perspective view of a portion of the apparatus of FIG. 5 with the turbine assembly in the second position. In FIG. 6, connection point 484 of the support structure 440 to the buoyancy vessel 410 that is associated with a ram and therefore acts as a pull point. Connection points 482a, 482 b of the support structure to the buoyancy vessel 410 act as pivot points about which the support structure can rotate to effect the vertical movement between the first and second positions.

Similarly, in FIG. 7, connection point 584 of the support structure 540 to the buoyancy vessel 410 that is associated with a ram and therefore acts as a pull point. Connection points 582a, 582 b of the support structure to the buoyancy vessel 510 act as pivot points about which the support structure can rotate to effect the vertical movement between the first and second positions.

In the view shown in FIGS. 6 and 7 it can be appreciated the greater vertical distance present in apparatus 400 between the "pull point" located at connection point 484 of the support structure 440 to the buoyancy vessel 410 and the "pivot points" located connection points 482a, 482 b of the support structure 440 to the buoyancy vessel 410, compared to the vertical distance between "pull point" 584 and pivot points 582 of the power generating apparatus 500 of FIG. 7.

Figure 9:
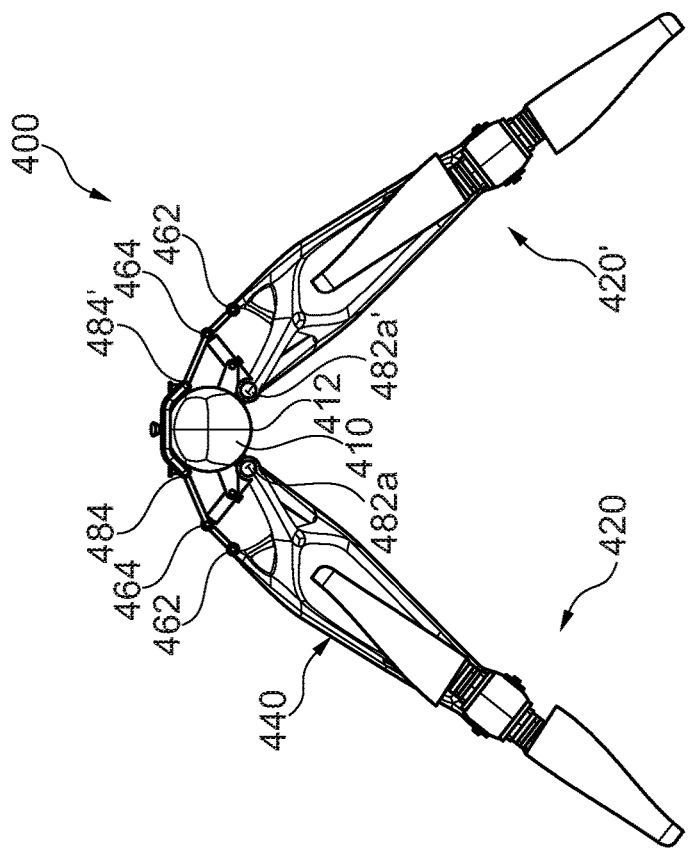
FIG. 9 shows a front view of the apparatus of FIGS. 4 and 6 in the first position.
Figure 8:
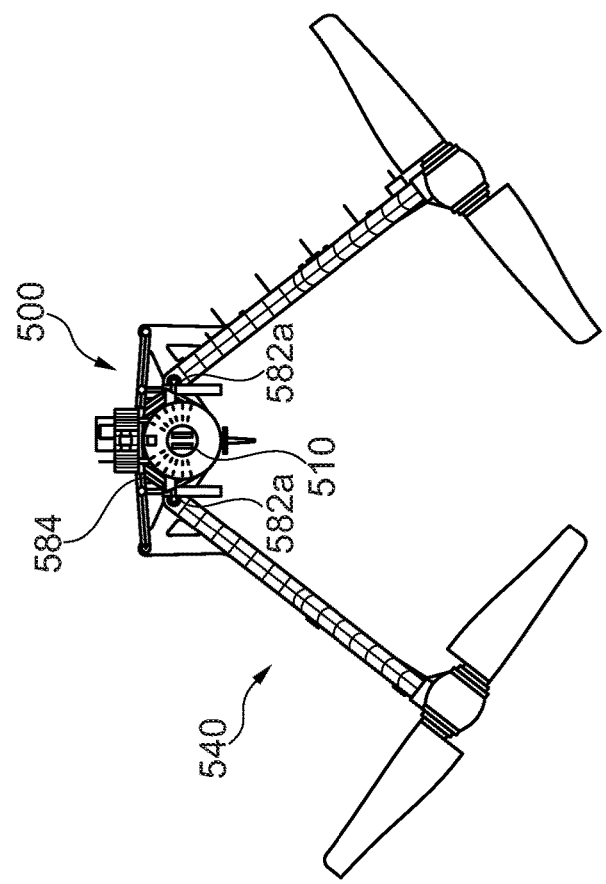
FIG. 8 shows a front view of the apparatus of FIGS. 5 and 7 with the turbine assembly in the first position.

FIG. 8 shows a front view of the apparatus of FIGS. 5 and 7 with the turbine assembly in the first position. FIG. 9 shows a front view of the portion of the apparatus of FIGS. 4 and 6 in the first position. In the view of apparatus 400 shown in FIG. 9 it can be observed that the "pivot" connection point 482 of the bottom portion of the support structure 440 to the buoyancy vessel 410 is disposed towards the baseline 412 of the buoyancy vessel. The connection points 482 of the bottom portion of the support structure 440 to the buoyancy vessel 410 are located at a distance from the baseline 412 of the buoyancy vessel from about $\frac{1}{14}^{th}$ to about $\frac{1}{8}^{th}$ of the total perimeter of the buoyancy vessel. The connection points 482 of the two support structures 440 are disposed close to each other, being separated by a distance covering from about $\frac{1}{7}^{th}$ to about ½ of the perimeter of the buoyancy vessel.

In contrast, as shown in FIG. 8, the "pivot" connection points 582 of power generating apparatus 500 are disposed in the upper half of the buoyancy vessel and the connection points 582 of each of the two support structures are separated from the corresponding connection points 582 of the other of the two support structures to the buoyancy vessel 510 by a distance of about half or greater than half of the perimeter of the buoyancy vessel. As discussed above, the connection arrangement of the turbine assemblies 420 to the buoyancy vessel 410 of power generating apparatus 400 confers a greater mechanical advantage than the connection arrangement of power generating apparatus 500, thus enabling greater scalability of the support structures and/or turbines, as well as the use of less power to actuate the turbine assemblies 420 between the first and second positions.

Figure 10A:
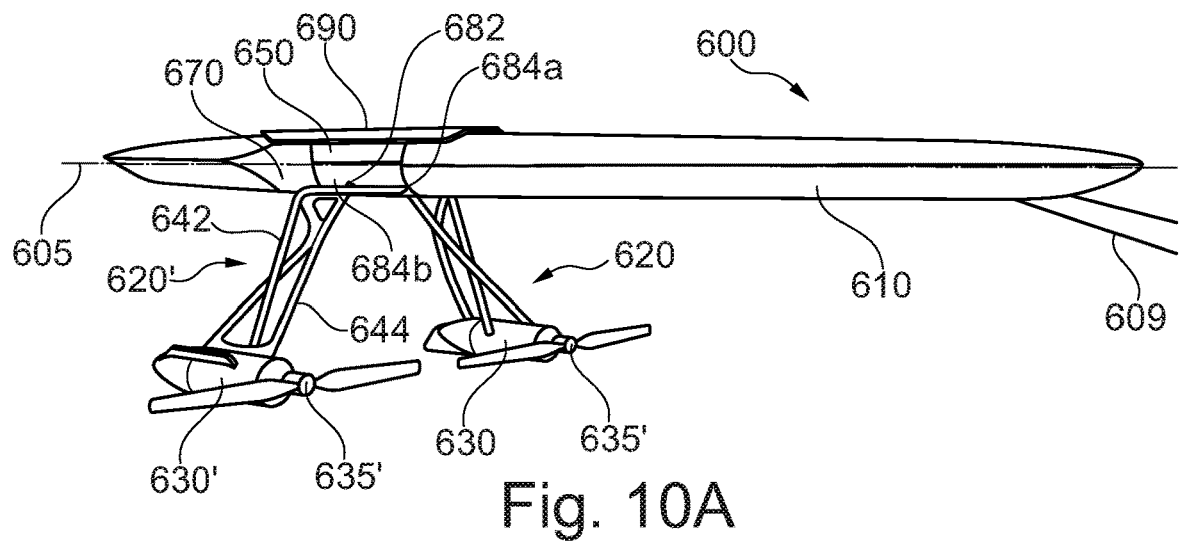
FIG. 10A shows a perspective view a power generating apparatus according to another embodiment of the invention in the first position.

FIG. 10A shows a perspective view a power generating apparatus 600 according to another embodiment of the invention in the first position. Features in common with the power generating apparatus of FIG. 1 are provided with like reference numerals, incremented by 500.

Power generating apparatus 600 comprises an elongate buoyancy vessel 610 comprising a platform 690 disposed on the upper surface of the buoyancy vessel and two turbine assemblies 620, 620' symmetrically disposed about the longitudinal axis of the buoyancy vessel 610. The apparatus 600 is schematically shown floating on a body of water with the waterline being 605. The apparatus 600 is moored to the sea or river bed by mooring lines 609.

The turbine assemblies have an open support structure comprising a bottom portion 644 and a top portion 642. The support structure is connected to a nacelle 630 which comprises a turbine 635 with two rotor blades. The support structure is open from the top and open from a side and defines an open support frame.

The top portion 642 and bottom portion 644 of the support structure are indirectly connected to the buoyancy vessel 610 by means of a slidable plate or bearing 650. The top portion 642 is connected to plate 650 at two connection points 684a and 684b. The bottom portion 644 is connected to plate 650 at one connection point 682. Connection point 682 of the bottom portion is located above connection points 684a and 684b of the top portion. Therefore, the connection point 682 of the bottom portion to the buoyancy vessel 610 is located at a greater distance from the baseline of the buoyancy vessel 610 than the connection points 684a, 684b of the top portion 642 to the buoyancy vessel.

The distance of the connection point or points 684a, 684b of the top portion and the connection point of the bottom portion 682 to the buoyancy vessel with respect to the baseline of the buoyancy vessel is variable by altering the height of the plate 650, while the vertical and horizontal distance between the connection points 684a, 684b, 682 is fixed on the plate 650.

In this embodiment, slidable plate 650 is curved and conforms to the shape of the buoyancy vessel 610. Plate 650 is slidable along the contour of the buoyancy vessel along guides integral with or attached to the buoyancy vessel 610. This enables the plate 650 to rotate around the buoyancy vessel so as to alter the distance of the plate 650 from the baseline of the buoyancy vessel between the first and second positions of the turbine assemblies.

The top portion 642 of each support structure defines an apex on which a winch anchor point 670 is located. The apparatus 600 comprises a winch (not shown) as a powered mechanism to move the turbine assemblies 620, 620' between the first and second positions.

Figure 10B:
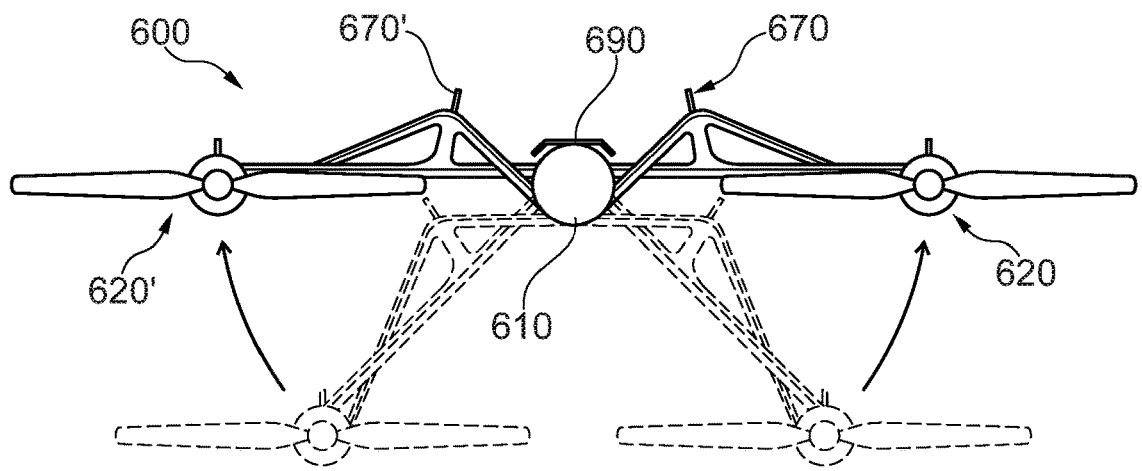
FIG. 10B shows a front view of the apparatus of FIG. 10B in the second position and shadowed in the first position.

FIG. 10B shows a front view of the apparatus 600 of FIG. 10B in the second position and shadowed in the first position. As seen in FIG. 10b, the turbine assemblies 620, 620' effect a rotational movement about the buoyancy vessel 610 from the first position to the second position. The anchor points 670, 670' are the highest point of the power generating apparatus when the turbine assemblies 620, 620' are in the second position (forming a substantially horizontal line, which is perpendicular to the longitudinal axis of the buoyancy vessel 610). This is because anchor points 670, 670' are disposed on an apex of the top portion 642, 642' of the support structure. This apex is therefore a gin pole.

Elevating the winch anchor point 670 above the support structure results in the winch line (better seen in the schematic representation of FIG. 11) being substantially horizontal (or perpendicular to the longitudinal axis of the buoyancy vessel) when the turbine assemblies 620, 620' are in the second position. This in turn minimises the tension required in the winch line. Providing a winch anchor points 670, 670' on the support structures enables the winch anchor points to be both higher and closer to the buoyancy vessel 610. This in turn makes the winch anchor points 670, 670' more easily reachable (e.g. from platform 690), and to improve the lift moment.

Figure 11:
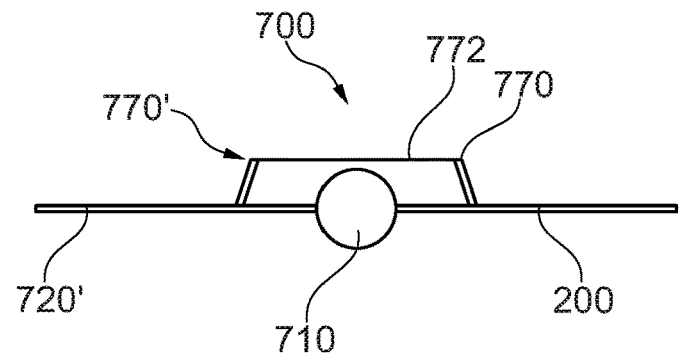
FIG. 11 shows a schematic representation of the bow string effect experienced by a powered mechanism connected to the turbine assemblies of a power generating apparatus according to the invention in the second position.

FIG. 11 shows a schematic representation of the bow string effect experienced by a powered mechanism connected to the turbine assemblies of an apparatus 700 according to an embodiment of the invention in the second position. This schematic representation represents how the turbine assemblies 720, 720' are configured to react against each other and employ the bow string effect for the final part of the lift from the first position to the second position. This would apply to an apparatus having a winch or a ram and associated mechanical linkage to move the turbine arrangements 720, 720' between the first and second positions.

Employing the bow string effect to lift the turbine assemblies 720, 720' to the second position is beneficial since the maximum force required during the lifting of the turbine assemblies 720, 720' to the second position is when they approach the horizontal. The force required to be applied to lift the turbine assemblies 720, 720' is dramatically reduced if applied in the downwards direction. Therefore, employing the bow string effect for lifting the turbine assemblies 720, 720' to the second position permits to stop using the powered lift mechanism when the turbine assemblies are close to the second position and to have a second lifting stage which involves reacting the legs off one another.

Figure 12A:
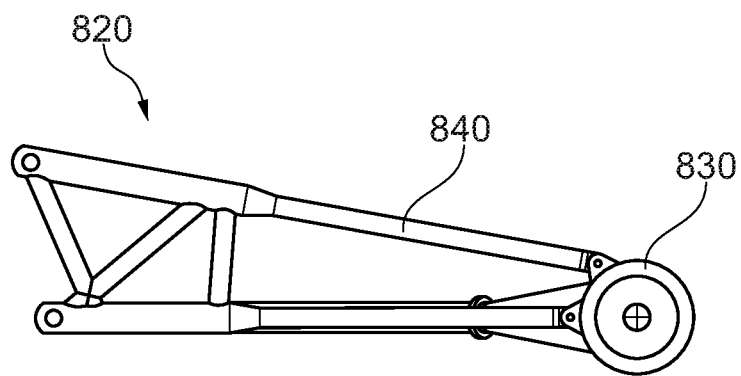
FIGS. 12A and 12B show front and perspective views of an embodiment of a turbine assembly having an open structure and comprising a nacelle at the outboard end of the support structure.
Figure 12B:
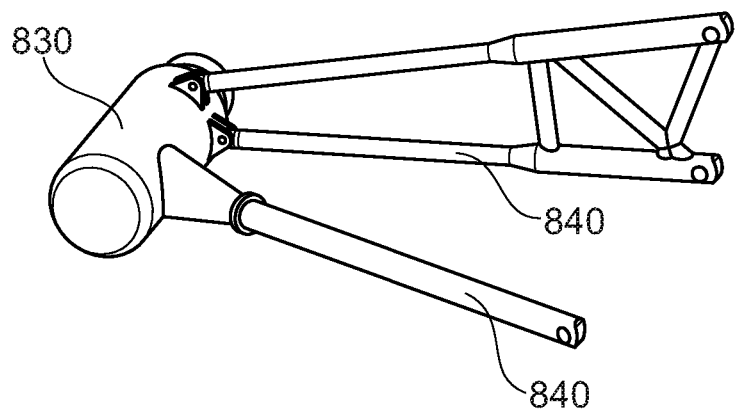

FIGS. 12A and 12B show front and perspective views of an embodiment of a turbine assembly 820 having an open support structure 840 and comprising a nacelle 830 at the outboard end of the support structure 840. The support structure 840 is a framework support structure configured to be pivotally coupled to a buoyancy vessel at its inboard end, while the nacelle 830 remains at its outboard end.

Although not a requirement, the structural components of the open support structure of the turbine assemblies of the exemplified embodiments according to the invention (e.g. the main members 242, 244, and the branched member 246 and struts 248a, 248b, 248c) are hydrodynamically shaped, for example as hydrofoils. In some embodiments, the structural components of the open support structure of the turbine assembly may be moveable. For example, the structural components of the open support structure (e.g. the main member or a portion thereof, the strut or struts and optionally the one or more branched members of the top portion and/or the bottom portion of the support structure) may be moved about a variable pitch angle. The pitch angle may be actively variable to resist roll. This is the optimal configuration to minimise drag while towing the power generating apparatus as well as minimise the shadow effect experienced by the rotor blades of the turbines.

The power generating apparatuses shown in the figures may be manufactured from any suitable material, such as steel or low density materials. The support structure of the turbine assembly may be manufactured of any suitable material, such as steel, reinforced concrete, low density materials such as carbon fibre and the like. In preferred embodiments, the support structure of the turbine assembly is manufactured from carbon fibre in order to further reduce the weight of the support structure and improve scalability or enable the use of less power for moving the turbine assemblies between the first and second positions.

Whilst the invention has been described in connection with the foregoing illustrative embodiments, various modifications, additions and alterations may be made to the invention by one skilled in the art without departing from the scope of the claimed invention.

For example, in the described embodiments the power generating apparatus has a single buoyancy vessel with two turbine assemblies symmetrically disposed about the buoyancy vessel. However, in some embodiments the power generating apparatus may comprise a different number of buoyancy vessels, for example connected tethered to each other.

The power generating apparatus may have only one turbine assembly, or for example three, four, five, six, seven, eight or any suitable number of turbine assemblies.

The turbines of the exemplified embodiments have two rotor blades. However, in other embodiments the turbines may have any number of rotor blades, for example three or four.

In the exemplified embodiments the turbine assemblies are movably coupled to the buoyancy vessel closer to one of the stern or bow section of the buoyancy vessel, however the terms stern and bow may be interchangeable in these embodiments, and the turbine assemblies may be coupled at any location along the length of the buoyancy vessel.

Although in the exemplified embodiments the turbine assemblies are coupled to the buoyancy vessel, the turbine assembly or assemblies may be coupled to any other suitable load bearing structure that is supported by the buoyancy vessel.

The invention claimed is:

1. A power generating apparatus for extracting energy from flowing water, comprising: a buoyancy vessel, and a turbine assembly coupled to the buoyancy vessel; the turbine assembly comprising a turbine rotor mounted to a nacelle, and a support structure; the support structure comprising an open structure defining at least one void configured to provide a passage for water to flow through; and the support structure being coupled at its outboard end to the nacelle; wherein the support structure comprises a top portion and a bottom portion defining the open support structure, the top portion and the bottom portion being vertically spaced apart and wherein the top portion and the bottom portion are each coupled to or integral with the nacelle at the outboard end of the support structure and movably coupled at vertically spaced apart locations to the buoyancy vesselat the inboard end of the support structure; the turbine assembly being pivotally moveable between a first position and a second position; wherein, when the power generating apparatus is floating on a body of water; in the first position the nacelle is configured to be fully submerged below the water surface; and in the second position at least a part of the nacelle is configured to project above the water surface.

2. The power generating apparatus of claim 1, comprising two, or more than two, turbine assemblies.

3. The power generating apparatus of claim 2, wherein the two or more turbine assemblies are symmetrically disposed about the buoyancy vessel.

4. The power generating apparatus of claim 1, wherein the turbine assembly is configured to pivot around an axis that is generally parallel to a longitudinal axis of the buoyancy vessel.

5. The power generating apparatus of claim 1, comprising a powered mechanism associated with the turbine assembly, for moving the turbine assembly between the first and second positions, operatively coupled between the buoyancy vessel and a said turbine assembly and/or wherein the powered mechanism comprises at least one winch, operatively coupled between the buoyancy vessel and a said turbine assembly.

6. The power generating apparatus of claim 1, wherein the turbine assembly is pivotally moveable around a hinge arrangement which, in use, is configured to remain below the waterline in the first position and in the second position.

7. The power generating apparatus of claim 1, wherein the support structure of the turbine assembly is open from one or both of: a side and above, when viewed floating on a body of water.

8. The power generating apparatus of claim 1, wherein the support structure of the turbine assembly comprises a top portion and a bottom portion;
   wherein the top portion and the bottom portion are vertically spaced apart;
   wherein top portion and the bottom portion are coupled to or integral with the nacelle at the outboard end of the support structure; and
   wherein the top portion and the bottom portion are both movably coupled to the buoyancy vessel at the inboard outboard end of the support structure.

9. The power generating apparatus according to claim 8, wherein the top portion and the bottom portion are connected to each other by one or more struts.

10. The power generating apparatus of claim 8, wherein each of the top portion and the bottom portion comprises a main member that runs from the inboard end to the outboard end of the support structure;
   wherein each of the main member of the top portion and the main member of the bottom portion is connected to or integral with the nacelle at the outboard end of the support structure; and
   wherein each of the main member of the top portion and the main member of the bottom portion is pivotally connected to the buoyancy vessel at the inboard end of the support structure.

11. The power generating apparatus according to claim 10, wherein the main member of the top portion and/or the main member of the bottom portion comprises one or more branched members extending from the main member to the inboard end of the support structure; and wherein the one or more branched members and the main member are pivotally connected to the buoyancy vessel in a horizontally spaced arrangement along the length of the buoyancy vessel.

12. The power generating apparatus according to claim 11, wherein the main member and the one or more branched members are pivotally connected to the buoyancy vessel along a line that is substantially parallel to the longitudinal axis of the buoyancy vessel.

13. The power generating apparatus according to claim 8, wherein the top portion and the bottom portion are pivotally coupled to the buoyancy vessel at vertically spaced locations.

14. The power generating apparatus according to claim 13, wherein the top portion is pivotally coupled to the buoyancy vessel at one or more locations disposed closer to the waterline than the one or more locations at which the bottom portion is pivotally coupled to the buoyancy vessel.

15. The power generating apparatus according to claim 13, wherein the top portion is pivotally coupled to the buoyancy vessel at one or more locations that, in use, are configured to remain above the waterline and is/are closer to the waterline than the connection point or points of the bottom portion to the buoyancy vessel.

16. The power generating apparatus according to claim 13, wherein a connection point or points of the bottom portion of the support structure to the buoyancy vessel are disposed at or towards the baseline of the buoyancy vessel; and wherein a connection point or points of the top portion of the support structure to the buoyancy vessel is located above the waterline.

17. The power generating apparatus according to claim 13, wherein the connection point or points of the bottom portion of the support structure to the buoyancy vessel are vertically separated from the connection point or points of the top portion of the support structure to the buoyancy vessel by a distance of from about to 50% to about 100% of the total height of the buoyancy vessel.

18. The power generating apparatus according to claim 13, wherein the connection point or points of the top portion of the support structure to the buoyancy vessel are vertically and horizontally offset from the connection point or points of the bottom portion of the support structure to the buoyancy vessel.

19. The power generating apparatus of claim 1 wherein the support structure is hydrodynamically shaped.

20. A power generating apparatus for extracting energy from flowing water, comprising:

a buoyancy vessel, and a turbine assembly coupled to the buoyancy vessel;

the turbine assembly comprising a turbine rotor mounted to a nacelle, and a support structure coupled at its outboard end to the nacelle;

the support structure comprising an open structure defining at least one void configured to provide a passage for water to flow through; and the support structure comprising a top portion and a bottom portion, the top portion and the bottom portion being vertically spaced apart, wherein each of the top portion and the bottom portion comprises a main member that runs from the inboard end to the outboard end of the support structure, wherein each of the main member of the top portion and the main member of the bottom portion is connected to or integral with the nacelle at the outboard end of the support structure, wherein each of the main member of the top portion and the main member of the bottom portion is pivotally connected to the buoyancy vessel at the inboard end of the support structure, wherein the main member of the top portion and/or the main member of the bottom portion comprises one or more branched members extending from the main member to the inboard end of the support structure, and wherein the one or more branched members and the main member are pivotally connected to the buoyancy vessel in a horizontally spaced arrangement along the length of the buoyancy vessel; and the turbine assembly being pivotally moveable between a first position and a second position, wherein, when the power generating apparatus is floating on a body of water, in the first position the nacelle is configured to be fully submerged below the water surface, and in the second position at least a part of the nacelle is configured to project above the water surface.

\* \* \* \* \*